US007018852B2

(12) United States Patent
Wu et al.

(10) Patent No.: US 7,018,852 B2
(45) Date of Patent: Mar. 28, 2006

(54) METHODS FOR SINGLE QUBIT GATE TELEPORTATION

(75) Inventors: Lian-Ao Wu, Toronto (CA); Daniel Lidar, Toronto (CA); Alexandre Blais, Sherbrooke (CA)

(73) Assignees: D-Wave Systems, Inc., Vancouver (CA); The Governing Council of the University of Toronto, Toronto (CA)

( * ) Notice: Subject to any disclaimer, the term of this patent is extended or adjusted under 35 U.S.C. 154(b) by 112 days.

(21) Appl. No.: 10/628,128

(22) Filed: Jul. 25, 2003

(65) Prior Publication Data

US 2004/0119061 A1 Jun. 24, 2004

Related U.S. Application Data

(60) Provisional application No. 60/400,844, filed on Aug. 1, 2002.

(51) Int. Cl.
*G06F 11/08* (2006.01)
*H01L 21/00* (2006.01)
*G06N 1/00* (2006.01)

(52) U.S. Cl. .................. 438/2; 438/962; 371/37.2; 371/40.4; 505/190

(58) Field of Classification Search ............... 371/37.2, 371/40.4; 438/2, 962; 505/190, 193
See application file for complete search history.

(56) References Cited

U.S. PATENT DOCUMENTS 5,307,410 A  4/1994  Bennett

| 5,917,322 | A | 6/1999 | Gershenfeld et al. |
| 6,459,097 | B1 | 10/2002 | Zagoskin |
| 6,563,311 | B1 | 5/2003 | Zagoskin |
| 6,897,468 | B1* | 5/2005 | Blais et al. ..................... 257/9 |
| 2003/0164490 | A1 | 9/2003 | Blais |
| 2003/0169041 | A1* | 9/2003 | Coury et al. ................. 324/307 |
| 2004/0000666 | A1 | 1/2004 | Lidar et al. |
| 2004/0109631 | A1 | 6/2004 | Franson et al. |
| 2004/0165454 | A1* | 8/2004 | Amin et al. ................. 365/200 |
| 2004/0238813 | A1* | 12/2004 | Lidar et al. ..................... 257/31 |
| 2005/0082519 | A1* | 4/2005 | Amin et al. ................... 257/13 |
| 2005/0101489 | A1* | 5/2005 | Blais et al. ................. 505/193 |

FOREIGN PATENT DOCUMENTS

WO    WO-99/14614 A1    3/1999

OTHER PUBLICATIONS

U.S. Appl. No. 60/349,663, Zagoskin et al.

(Continued)

*Primary Examiner*—Anh Duy Mai
(74) *Attorney, Agent, or Firm*—Jones Day; Brett Lovejoy

(57) ABSTRACT

A method for performing a single-qubit gate on an arbitrary quantum state. An ancillary qubit is set to an initial state |I>. The data qubit is coupled to an ancillary qubit. The state of the ancillary qubit is measured, and the data qubit and the ancillary qubit are coupled for a first period of time. A method for applying a single-qubit gate to an arbitrary quantum state. A state of a first and second ancillary qubit are set to an entangled initial state |I>. A state of a data qubit and the first ancillary qubit are measured thereby potentially performing a single qubit operation on the arbitrary quantum state. A first result is determined. The first result indicates whether the single qubit operation applied the single qubit gate to the arbitrary quantum state.

51 Claims, 8 Drawing Sheets

OTHER PUBLICATIONS

Averin, D.V., 2002, "Quantum Nondemolition Measurements of a Qubit," Phys. Rev. Lett. 88, 207901.

Averin, D.V., R. Fazio, 2002, "Active suppression of dephasing in Josephson-junction qubits," ArXiv.org preprint server: cond-mat/0212127.

Barenco, A., C.H. Bennett, R. Cleve, D.P. DiVincenzo, N. Margolus, P. Shor, T. Sleator, J.A. Smolin, and H. Weinfurter, 1995, "Elementary gates for quantum computation," Phys. Rev. A 52, 3457-3467.

Bennett, C.H., G. Brassard, C. Crepeau, R. Jozsa, A. Peres, and W.K. Wootters, 1993, "Teleporting an Unknown Quantum State via Dual Classical and Einstein-Podolsky-Rosen Channels," Phys. Rev. Lett. 70, pp. 1895-1899.

Blais, A., and A.M. Zagoskin, 2000, "Operation of universal gates in a solid-state quantum computer based on clean Josephson junctions between d-wave superconductors," Phys. Rev. A 61, 042308.

Brown, K.R., D. A. Lidar, and K. B. Whaley, 2001, "Quantum computing with quantum dots on quantum linear supports," Phys. Rev. A 65, 012307.

Burkard, G., H.-A. Engel, and D. Loss, 2000, "Spintronics and Quantum Dots for Quantum Computing and Quantum Communication," published on ArXiv.org preprint server: cond-mat/0004182 (2000).

Childs, A.M., I.L. Chuang, and D.W. Leung, 2000, "Realization of quantum process tomography in NMR," ArXiv.org preprint server: quant-ph/0012032.

Choi, M.-S., 2001, "Solid-state implementation of quantum teleportation and quantum dense coding," Phys. Rev. A 64, 054301.

Choi, M.-S., M.Y. Choi, T. Choi, and S.-I. Lee, 1998, "Cotunneling Transport and Quantum Phase Transitions in Coupled Josephson-Junction Chains with Charge Frustration," Phys. Rev. Lett. 81, 4240-4243.

Cirac, J.I., and P. Zoller, 1995, "Quantum Computations with Cold Trapped Ions," Phys. Rev. Lett. 74, pp. 4091-4094.

Cottet, A., D. Vion, A. Aassime, P. Joyez, D. Esteve, and M.H. Devoret, 2002, "Implementation of a combined charge-phase quantum bit in a superconducting circuit," Physica C 367, pp. 197-203.

DiVincenzo, D.P., 2000, "The Physical Implementation of Quantum Computation", published on ArXiv.org preprint server: quant-ph/0002077.

Dodd, J.L., M. A. Nielsen, M.J. Bremner, and R.T. Thew, 2002, "Universal quantum computation and simulation using any entangling Hamiltonian and local unitaries," Phys. Rev. A 65, 040301.

Falci, G., R. Fazio, G.M. Palma, J. Siewert, and V. Vedral, 2000, "Detection of geometric phases in superconducting nanocircuits," Nature 407, 355-358.

Gottesman, D., and I.L. Chuang, 1999, "Demonstrating the Viability of Universal Quantum Computation using Teleportation and Single-Qubit Operations," Nature 402, pp. 390-393.

Imamoglu, A., D.D. Awschalom, G. Burkard, D.P. DiVincenzo, D. Loss, M. Sherwin, and A. Small, 1999, "Quantum Information Processing Using Quantum Dot Spins and Cavity QED," Phys. Rev. Lett. 83, pp. 4204-4207.

Kane, B.E., 1998, "A silicon-based nuclear spin quantum computer," Nature 393, 133-137.

Kane, B.E., 2000, "Silicon-based Quantum Computation," published on ArXiv.org preprint server: quant-ph/0003031.

Kikkawa, J.M., I.P. Smorchkova, N. Samarth, and D.D. Awschalom, 1997, "Room-Temperature Spin Memory in Two-Dimensional Electron Gases," Science 277, pp. 1284-1287.

Knill, E., R. Laflamme, and G.J. Milburn, 2001, "A scheme for efficient quantum computation with linear optics", Nature 409, pp. 46-52.

Koashi, M., T. Yamamoto, and N. Imoto, 2001, "Probabilistic manipulation of entangled photons," Phys. Rev. A, 63, 030301.

Korotkov, A.N., 1999, "Continuous quantum measurement of a double dot," Phys. Rev. B 60, pp. 5737-5742.

Korotkov, A.N., 2001, "Selective quantum evolution of a qubit state due to continuous measurement," Phys. Rev. B 63, 115403.

Leung, D.W, 2002, "Two-qubit Projective Measurements are Universal for Quantum Computation," ArXiv.org preprint server: quant-ph/0111122.

Levy, J., 2001, "Quantum-information processing with ferroelectrically coupled quantum dots," Phys. Rev. A 64, 052306.

Lidar, D.A., and L.-A. Wu, 2002, "Reducing Constraints on Quantum Computer Design by Encoded Selective Recoupling," Phys. Rev. Lett. 88, 017905.

Loss, D., and D.P. DiVincenzo, 1998, "Quantum computation with quantum dots," Phys. Rev. A 57, pp. 120-126.

Maassen van den Brink, A., 2002, "Quantum-efficient charge detection using a single-electron transistor," Europhysics Letters 58, pp. 562-568.

Makhlin Yu., G. Schön, and A. Shnirman, 2001, "Quantum-State Engineering with Josephson-Junction Devices," Rev. of Mod. Phys. 73, pp. 357-400.

Masanes, L.I., G. Vidal, J. I. Latorre, 2002, "Time-optimal Hamiltonian simulation and gate synthesis using homogeneous local unitaries," ArXiv.org preprint server: quant-ph/0202042.

Mozyrsky, D., V. Privman, and M.L. Glasser, 2001,"Indirect Interaction of Solid-State Qubits via Two-Dimensional Electron Gas," Phys. Rev. Lett. 86, pp. 5112-5115.

Nielsen, M.A., 2001, "Universal quantum computation using only projective measurement, quantum memory, and preparation of the |0> state," ArXiv.org preprint server: quant-ph/0108020.

Nielsen, M.A., and I.L. Chuang, 1997, "Programmable Quantum Gate Arrays," Phys. Rev. Lett. 79, pp. 321-324.

Nielsen, M.A., and I.L. Chuang, 2000, *Quantum Computation and Quantum Information*, Cambridge University Press, Cambridge, 2000, pp. xxiii-xxv, 26-28, 65, 474-478.

Platzman, P.M., and M.I. Dykman, 1999, "Quantum Computing with Electrons Floating on Liquid Helium," Science 284, pp. 1967-1969.

Raussendorf, R., and H.J. Briegel, 2001, "A One-Way Quantum Computer," Phys. Rev. Lett. 86, pp. 5188-5191.

Preskill, J., 1998, "Reliable Quantum Computers," Proc. R. Soc. London, Ser. A 454, pp. 385-410.

Shnirman, A., and G. Schön, 1998, "Quantum measurements performed with a single-electron transistor," Phys. Rev. B 57, pp. 15400-15407.

Stucki, D., N. Gisin, O. Guinnard, G. Ribordy, and H. Zbinden, 2002, "Quantum Key Distribution over 67 km with a plug & play system," New Journal of Physics 4, 41.

Vidal, G., L. Masanes, and J.I. Cirac, 2002, "Storing Quantum Dynamics in Quantum States: A Stochastic Programmable Gate," Phys. Rev. Lett. 88, 047905.

Vrijen, R, E. Yablonovitch, K. Wang, H. W. Jiang, A. Balandin, V. Roychowdhury, T. Mor, and D. DiVincenzo, 2000, "Electron-spin-resonance transistors for quantum computing in silicon-germanium heterostructures," Phys. Rev. A 62, 012306.

Zheng, S.-B., and G-C Guo, 2000, "Efficient Scheme for Two-Atom Entanglement and Quantum Information Processing in Cavity QED," Phys. Rev. Lett. 85, pp. 2392-2395.

Jang, J., J. Lee, M.S., Kim, Y.-Y., Park, 2001, "Probabilistic nonlocal gate operation via imperfect entanglement," arXiv:quant-ph/0101107 v1.

Nielson, M.A., and I.L. Chuang, 2000, *Quantum Computation and Quantum Information*, Cambridge University Press, Cambridge, 2000, pp. 69-71, 171-188, 472-473, 479-493.

Shor, P.W., 1996, "Fault-Tolerant Quantum Computation," Institute of Electrical and Electronics Engineers, Proceedings of the 37th Annual Symposium on Foundations of Computer Science, Los Alamitso, IEEE Comp. Soc. Press, US, vol. SYMP. 37, pp. 56-65.

Wu, N.-J., H. Hassu, Y. Amemiya, H. Yasunga, "Analog Computation Using Quantum-Dot Spin Glass," Extended Abstracts of the 1998 International Conference on Solid State Devices and Materials, Hiroshima, 1998, pp. 192-193.

International Search Report for PCT/CA03/01161 dated Apr. 3, 2005.

* cited by examiner

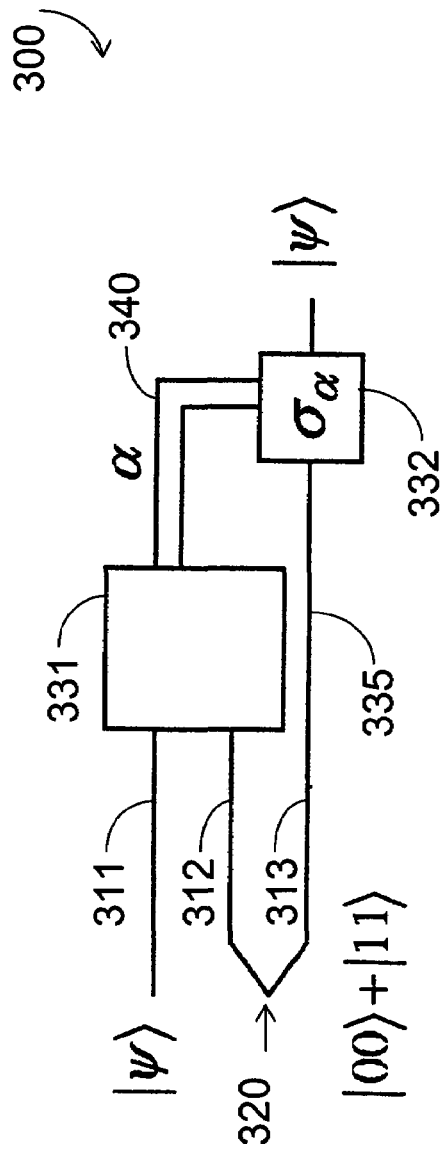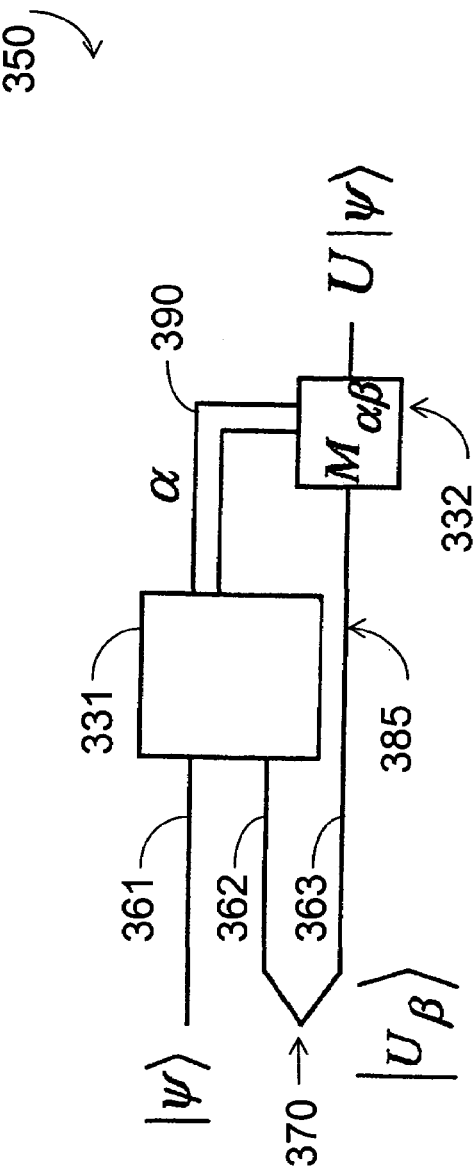
FIG. 3A
FIG. 3B

METHODS FOR SINGLE QUBIT GATE TELEPORTATION

CROSS-REFERENCE TO RELATED APPLICATIONS

This application claims benefit, under 35. U.S.C. § 119(e), of U.S. Provisional Patent Application No. 60/400,844 filed on Aug. 1, 2002 which is incorporated herein, by reference, in its entirety.

FIELD OF THE INVENTION

The present invention relates to improved methods for quantum information processing, storage and communication.

BACKGROUND OF THE INVENTION

Advantages of Quantum Information Processing

Quantum information processing (QIP) includes the fields of quantum computing, quantum communication, and quantum cryptography. Quantum computing using quantum computers holds promise for outperforming classical computers. See, for example, Nielsen and Chuang, *Quantum Computation and Quantum Information*, Cambridge University Press, 2000. Quantum communication provides a method for information theoretic secure cryptographic systems. Information theoretic security makes no assumptions about the resources available to the eavesdropper. Indeed they could have a quantum computer. Commercially available quantum cryptographic systems exist. See Stucki et al., 2002, "Quantum Key Distribution over 67 km with a plug & play system," New Journal of Physics 4, 41. A topic related to quantum communications is quantum state teleportation. See Bennett et al., 1993, "Teleporting an unknown quantum state via dual classical and Einstein-Podolsky-Rosen channels," Physical Review Letters 70, 1895.

Requirements for Quantum Information Processing

A requirement in the field of QIP is that a quantum computer that supports QIP be capable of performing "universal quantum computation" (UQC). UQC requires five criteria. The first UQC criterion is a scalable physical system with well-characterized qubits. A qubit is a quantum two-level system like the two spin states of a spin ½ particle, like the ground and excited states of an atom, or like the vertical and horizontal polarization of a single photon. This implies that higher states, present in most real systems, must not be excited during quantum computing manipulations. The second UQC criterion is that the initial state of the qubits must be set with sufficient accuracy. The third UQC criterion is the need for a phase coherence time that is sufficient to allow for a large number (e.g., $10^4$ or greater) of coherent manipulations (e.g. quantum gates) before the quantum system decoheres. A quantum gate is a controlled interaction between qubits that produces a coherent change in the state of one qubit that is contingent upon the state of another qubit. The fourth UQC criterion is the need for sufficient control over the qubit's Hamiltonian in order to perform the necessary unitary transformations, e.g., single-qubit and two-qubit logic operations (gates). In order to apply the single and two-qubit gates for a given quantum computer there should exist a mechanism for controlling the state of the qubit. For the example of spin ½ particles in a magnetic field, control over the local magnetic field of the spin ½ particle is required. To implement two-qubit gates there should be a mechanism for coupling qubits in a known way, ideally with the possibility to switch the inter-qubit interactions on and off. In physics terms the two types of operations allow creating arbitrary superpositions and non-trivial coupled states, such as entangled states, respectively. Finally, the fifth UQC criterion is that quantum measurement is needed to read out the quantum information, either at the final stage or during the computation, e.g., for the purpose of error correction. See, for example, DiVincenzo in Braunstein and Lo (eds.), *Scalable Quantum Computers*, Wiley-VCH Verlag GmbH, Berlin (2001); Makhlin et al., 2001, "Quantum-State Engineering with Josephson-Junction Devices," Reviews of Modern Physics 73, 357, which are hereby incorporated by reference in their entireties.

Reducing the Requirements for Providing Unitary Transformations

Each of the five criteria necessary to achieve UQC present obstacles. One of the most difficult obstacles to UQC is presented by criterion (iv), above, i.e., sufficient control over the qubit's Hamiltonian in order to perform the necessary unitary transformations. These unitary transformations are also referred to as gates. It has been determined that all unitary transformations necessary to achieve UQC can be performed using single and two-qubit unitary transformations (also respectively termed one and two-qubit gates) (also respectively termed single-qubit operations and two-qubit operations). In fact, only one two-qubit unitary transformation, in addition to the single transformations, is needed to support UQC. For example, in the art the "quantum XOR" or "CNOT" is often used to support UQC. See, for example DiVincenzo in Braunstein and Lo (eds.), *Scalable Quantum Computers*, Wiley-VCH Verlag GmbH, Berlin (2001). For instance, any unitary transformation of a many-qubit system can be decomposed into single-bit gates and CNOT-gates. A CNOT gate is described as:

$$CNOT = \begin{pmatrix} 1 & 0 & 0 & 0 \\ 0 & 1 & 0 & 0 \\ 0 & 0 & 0 & 1 \\ 0 & 0 & 1 & 0 \end{pmatrix}$$

The CNOT gate acts on two qubits, a control and a target qubit, and flips the target whenever the control qubit is a |1>, e.g. |a,b> → |a,a ⊕ b>. In other words, in a CNOT operation, the state of one qubit is flipped if a second qubit is in the "1" (|1>) state but left unchanged if the second qubit is in the "0" (|0>) state. However, almost any two-qubit gate, when combined with single-bit gates, forms a universal set. See, for example, Makhlin et al., 2001, Reviews of Modern Physics 73, p. 357.

Much discussion has been given to the reduction of the requirements needed to implement the necessary unitary transformations (gates) in a scalable physical system of qubits. See, for example, Barenco et al., 1995, Physical Review A 52, 3457–3467; DiVincenzo in Braunstein and Lo (eds.), *Scalable Quantum Computers*, Wiley-VCH Verlag GmbH, Berlin (2001); and Dodd et al., "Universal quantum computation and simulation using any entangling Hamiltonian and local unitaries," LANL preprint quant-ph/0106064 (2001), each of which is hereby incorporated by reference in its entirety.

Reduction in the requirements needed to implement the necessary unitary transformations can lead to simpler, e.g. less expensive, more robust, more scalable devices for QIP. For example, in some quantum computers, particular single- and two-qubit unitary transformations (one and two-bit gates) are challenging to implement. Further, single-qubit operations often require specialized systems that increase the potential decoherence of the quantum state hence reducing the overall available computational time before errors occur. Examples of such quantum computers having specialized single-qubit operation systems include quantum dots and donor atom nuclear spins in silicon. See Loss and DiVincenzo, 1998, Physical Review A 57, 120; Levy, 2001, Physical Review A 64, 052306; Kane, 1998, Nature 393, 133; and Mozyrsky et al., 2001, Physical Review Letters 86, 5112 each of which is hereby incorporated by reference in its entirety. In these solid-state systems, single-qubit operations require control over a local magnetic field making them significantly slower than two-qubit operations (mediated by an exchange interaction), and require substantially greater material and device complexity. In the quantum dots in cavity quantum computers each dot needs to be illuminated with a separate laser. See Imamoğlu et al., 1999, Physical Review Letters 83, 4204. Reduction in the number of lasers by elimination of single-qubit operations is a potentially significant technical simplification.

Some quantum computers are based on electrons floating on superfluid helium. See Platzman and Dykman, 1999, Science 284, 1967. In electrons-on-helium quantum computers, single-qubit operations require slow microwave pulses, limiting the number of logic operations executable within the respective decoherence time.

Requirements for Implementing a Single-Qubit Gate

The requirements needed to implement a single-qubit gate (operation), e.g., the Z gate, are illustrated using FIG. 2A as a reference. The single-qubit Pauli Z gate is a unitary transformation in a scalable physical system of qubits. FIG. 2A is a quantum circuit diagram that represents the application of a single-qubit Pauli Z gate on the state of a qubit. Quantum circuit diagrams, such as FIG. 2A, are used in the art to illustrate the application of a set of quantum computing operations (e.g. single-qubit gates, two-qubit gates) to the quantum states of one or more qubits over a given time period. In quantum circuit diagrams, such as FIG. 2A, the horizontal line Q1—Q1 represents a qubit. By art-accepted convention, time progresses from left to right in FIG. 2A and all circuit diagrams hereafter. Operations (e.g., single-qubit gates) performed on the qubit represented by Q1—Q1, such as the single-qubit gate Z 204, are represented schematically. See, for example, Nielsen and Chuang, *Quantum Computation and Quantum Information*, Cambridge Univ. Press (2000).

The single-qubit Pauli Z gate (also referred to as a phase flip or $2_{T2}$) comprises the $\sigma^z$ Pauli matrix, where $$\sigma^z = \begin{bmatrix} 1 & 0 \\ 0 & -1 \end{bmatrix}$$

In a quantum computer, the single-qubit Pauli Z gate effects a phase flip operation on the state of the respective qubit. Here, the single-qubit Pauli Z gate is applied to the state of qubit $Q_1$—$Q_1$ for a period $T_2$. The periods $T_1$ and $T_3$ represent no evolution of the state of qubit $Q_1$—$Q_1$.

Implementations of the single-qubit Pauli Z gate require a biasing apparatus that can be difficult or problematic to construct. A biasing apparatus is specialized hardware designed to interact with qubits in a specialized way. Removal of the need for this biasing apparatus is therefore desirable. However, there is currently no satisfactory solution in the art that allows for the removal of such a biasing apparatus in a system that supports UQC.

Requirements for Implementing a Single-Qubit Gate in a Quantum Register

FIG. 1 illustrates an exemplary quantum register 100 that can be used in a quantum computer to perform quantum computing. Quantum register 100 includes a bank of unconventional superconducting material 110, an optional set of fingers 111-1 through 111-N, a set of mesoscopic islands 112-1 through 112-N, and a set of Josephson junctions 113-1 through 113-N that separate material 110 from respective mesoscopic islands 112. Each qubit 118 (encompassed by dashed lines) comprises a finger 111-*i*, a mesoscopic island 112-*i*, and a Josephson junction 113-*i*. See U.S. application Ser. No. 09/479,336, entitled "Qubit using Josephson a Junction between S-wave and D-wave Superconductor," previously incorporated herein by reference.

In some instances, bank 110 is formed from unconventional superconducting materials such as d-wave superconductors. Examples of unconventional superconducting materials include $YBa_2Cu_3O_{7-x}$, where x takes on values between 0.0 and about 0.6, $Bi_2Sr_2Ca_{n-1}Cu_nO_{2n+4}$, $Tl_2Ba_2CuO_{6+x}$, and $HgBa_2CuO_4$. In some instances, each junction 113 is a grain boundary Josephson junction in which the crystal lattice orientation of the superconducting material on one side of the grain boundary varies from the crystal lattice orientation of the superconducting material on the other side of the grain boundary. FIG. 1 illustrates a material having d-wave order parameter 119, which represents the d-wave pairing symmetry. Order parameter 119 has an angle $A_1$ with respect to the principle direction of the plane of Josephson junctions 113.

The phase differences between islands 112 and bank 110 across Josephson junctions 113 are suitable for forming bit states of each qubit 118. These phase differences correspond to the direction of circulating supercurrent in the vicinity of each junction 113 as well as to the direction of the magnetic flux that is associated with these supercurrents. The supercurrents flow in the vicinity of each junction 113, in the x-y plane defined in FIG. 1. Also shown in FIG. 1 are switches 140 between mesoscopic islands 112. Switches 140 allow for controllable coherent connections to be established between qubits 118. In some quantum registers 100, switches 140 are superconducting single electron transistors (SSET). The use of SSETs, also termed parity keys, is described in previously cited U.S. application Ser. No. 09/479,336. The coupling established by any of switches 140 is an example of an Ising or Josephson coupling.

Specialized systems for implementing the single-qubit Pauli Z gate (phase flip operation) on respective qubits 112 are described in the art. For example, Blais and Zagoskin suggest the use of a magnetic force microscope to perform such an operation. The tip of the magnetic force microscope moves toward or away from a qubit in register 100 during the application of the single-qubit gate Z. However, the short time scales of qubit operations, such as the single-qubit gate Z, make such systems difficult to realize. See Blais and Zagoskin, 2000, "Operation of universal gates in a solid-state quantum computer based on clean Josephson junctions between d-wave superconductors," Phys. Rev. A 61, 042308. In another example, specialized qubits, termed bus qubits, are used in the implementation of the single-qubit gate Z. See U.S. Pat. No. 6,563,311 B2, entitled "Quantum Computing Method Using Magnetic Flux States at a Josephson Junction", which is hereby incorporated by reference in its entirety.

The manufacture of specialized systems for implementing gates such as the single-qubit gate for quantum registers, such as register 100, increases the complexity of such registers. It would be highly advantageous to reduce the complexity of such registers if such specialized systems were not required in order to implement quantum gates.

Teleportation of a Quantum State

The teleportation of quantum states (quantum state teleportation) holds promise for making fault-tolerant quantum computers more straightforward and methodical. See, Gottesman and Chuang, 1999, Nature 402, 390. Quantum state teleportation is a method for transmitting an unknown quantum state |ψ> from a sender (Alice) to a receiver (Bob) using only classical information. To illustrate this concept, consider quantum circuit 300 (FIG. 3A). There are three qubits in this exchange. The three qubits are denoted by lines 311, 312, and 313 in FIG. 3A. Time proceeds from left to right.

Label 320 in FIG. 3A denotes the entangled 'Eistein-Podolsky-Rosen' (EPR) state $(|00> + |11>)/\sqrt{2}$ of qubits 312 and 313. Initially, Alice has possession of qubit 311, with a quantum state |ψ>, and qubit 312 from the EPR state, while Bob has possession of qubit 313 from the EPR state. Alice measures qubits 311 and 312 in the Bell basis (step 331), obtaining one of four possible outcomes; 00, 01, 10, or 11, denoted α (FIG. 3A). See, for example, Nielsen and Chuang, *Quantum Computation and Quantum Information*, Cambridge University Press (2000), pp. 26–28, which is incorporated herein by reference. Alice communicates α to Bob on classical open channel 340.

Once Bob learns the measurement outcome α, Bob can 'fix up' the state of qubit 313, thereby recovering |ψ>, by applying the appropriate quantum gate. For example, in the case where α is 00, Bob doesn't need to do anything to qubit 313 to recover |ψ>. If α is 01, then Bob can fix up the state of qubit 313 by applying the Pauli X gate (a bit flip). If α is 10, then Bob can fix up the state of qubit 313 by applying the Pauli Z gate (a phase flip). If α is 11, then Bob can fix up the state of qubit 313 by first applying the Pauli X gate and then the Pauli Z gate. See, for example, Nielsen and Chuang, *Quantum Computation and Quantum Information*, Cambridge University Press (2000), pp. 26–28; Choi, 2001, Physical Review A 64, 054301-1-054301-4, which are hereby incorporated by reference in their entireties.

The quantum teleportation that transpires in circuit 300 is remarkable because the quantum state of a qubit is transported from a sender (Alice) to receiving qubit 313 (controlled by Bob) by communicating just two classical bits. Normally, the precise description of the phase |ψ> of qubit 311 takes an infinite amount of classical information since |ψ> takes values in a continuous space. However, quantum teleportation is able to transport this information using only two classical bits by taking advantage of the two-qubit entangled EPR state of qubits 312 and 313. The teleportation of a quantum state is well known in the art and forms the basis of at least one commercial device. See, for example, Stucki et al., 2002, "Quantum Key Distribution over 67 km with a plug & play system," New Journal of Physics 4, 41 which is hereby incorporated by reference in its entirety.

Although quantum teleportation shows promise in fields such as the design of fault-tolerant quantum computers, the technique does not provide a solution to the problem of simplifying the devices used to provide quantum gates in quantum computing devices such as quantum registers 100 (FIG. 1). Accordingly, there is a need in the art for improved methods and devices for implementing quantum gates in quantum computing devices.

SUMMARY OF THE INVENTION

A first aspect of the present invention provides a method for performing a single-qubit gate on the state of a data qubit. The method comprises (i) setting an ancillary qubit to a predetermined initial state |I>, (ii) coupling the data qubit and the ancillary qubit, (iii) measuring the state of the ancillary qubit; and (iv) a first coupling of the data qubit and the ancillary qubit for a first period of time. In some embodiments, the method further comprises measuring the state of the ancillary qubit thereby obtaining a result. In some instances this result indicates that the single-qubit gate was successfully performed on the state of the data qubit. In other instances, this result indicates that the single-qubit gate was not successfully performed. When the single-qubit gate was not successfully applied to the data qubit, the method further comprises a second coupling of data qubit and the ancillary qubit for a second period of time. In some embodiments, the predetermined initial state |I> comprises a superposition of basis states of the ancillary qubit. In some embodiments, the predetermined initial state has the form:

$$|I\rangle = \frac{a|0\rangle + b|1\rangle}{\sqrt{2}},$$

where,

|0> is a first basis state for the ancillary qubit;
|1> is a second basis state for the ancillary qubit;
a is a first probability amplitude;
b is a second probability amplitude; and
the magnitude of a and b are about the same.

In some embodiments, the predetermined initial state is obtained by applying a single-qubit Pauli X gate for a phase π/2 to the ancillary qubit for a duration $t_i$. In some embodiments, the duration $t_i$ is about $$\frac{h}{\Delta}\frac{\pi}{2},$$

where h is Planck's constant and Δ is the tunneling amplitude of the ancillary qubit.

In some embodiments, the data qubit is a superconducting qubit such as a superconducting phase qubit. In some embodiments, the superconducting phase qubit is comprised of an unconventional superconducting material. In some embodiments, the superconducting phase qubit is a permanent readout superconducting qubit. In other embodiments, the superconducting phase qubit is a two-junction flux qubit. In still other embodiments, the superconducting qubit is a superconducting charge qubit.

In some embodiments in accordance with the first aspect of the present invention, the first coupling of the data qubit and the ancillary qubit for a first period of time comprises applying a Josephson gate between the data qubit and the ancillary qubit. In some embodiments, the single-qubit gate is a single-qubit Pauli Z gate.

In some embodiments in accordance with the first aspect of the present invention, the first period of time is about $$\frac{h}{J_1} \cdot \frac{\pi}{2},$$

where, $J_1$ is a coupling term between the ancillary qubit and the data qubit during the first coupling; and h is Planck's constant; and the second period of time is about:

$$\frac{h}{J_2} \cdot \pi$$

where, $J_2$ is a coupling term between the ancillary qubit and the data qubit during said second coupling; and h is Planck's constant.

In some embodiments in accordance with the first aspect of the present invention, the second time period is about equal to the first time period. Furthermore, a coupling term between the ancillary qubit and the data qubit during the first coupling is about double a coupling term between the ancillary qubit and the data qubit during the second coupling.

In still other embodiments in accordance with the first aspect of the present invention, the first coupling of the data qubit and the ancillary qubit for the first period of time comprises an XX gate. In some embodiments, the single-qubit gate is an X gate or a bit-flip gate. In some embodiments, the coupling of the data qubit and the ancillary qubit is a YY gate. In some embodiments, the single-qubit gate is a Y gate.

A second aspect of the present invention provides a method for applying a single-qubit gate. The method comprises (i) setting a state of a first ancillary qubit and a state of a second ancillary qubit to a predetermined entangled initial state |I>, (ii) measuring a state of the data qubit and the first ancillary qubit thereby performing a single qubit operation, and (iii) determining a first result that indicates whether the single qubit operation applied the single qubit gate. In some instances, the first result indicates that the single-qubit gate was applied on the state of the second ancillary qubit. In other instances, the first result indicates that the single-qubit gate was not applied on the state of the second ancillary qubit. In these other instances, the method further comprises applying a first correction. This first correction comprises (a) measuring the state of the data qubit and the first ancillary qubit and (b) determining a second result that indicates whether the first correction applied the Hermitian conjugate of the single-qubit gate on the state of the second ancillary qubit. In some instances, the second result indicates that the first correction applied is the Hermitian conjugate of the single-qubit gate on the state of said second ancillary qubit. In other instances, the second result indicates that the Hermitian conjugate of the single-qubit gate was not applied on the state of the second ancillary qubit. In such cases, the method further comprises applying a second correction. This second correction comprises measuring the state of the data qubit and the first ancillary qubit and determining a third result that indicates whether the second correction applied the Hermitian conjugate of the single qubit gate to the state of the data qubit. In such instances, the third result indicates that the Hermitian conjugate of the single-qubit gate was applied to the state of the data qubit. In some embodiments, the state of the data qubit is corrected for the Hermitian conjugate of the single-qubit gate.

In some embodiments in accordance with the second aspect of the invention, the desired initial state |I> includes a superposition of basis states of the first ancillary qubit and the second ancillary qubit. In some embodiments, the initial state |I> has the form:

$$|I\rangle \approx \frac{1}{\sqrt{2}}(a|01\rangle - ib|10\rangle),$$

where,

|01> is a first state for said ancillary qubits;

|10> is a second state for said ancillary qubits;

a is a first probability amplitude;

b is a second probability amplitude;

the magnitude of a and b are about the same; and $i=\sqrt{-1}$.

In some embodiments in accordance with the second aspect of the invention, the data qubit is a superconducting qubit such as a superconducting phase qubit. In some embodiments, this superconducting phase qubit is comprised of an unconventional superconducting material. In some embodiments, this superconducting phase qubit is a permanent readout superconducting qubit. In some embodiments, the superconducting phase qubit is a two junction flux qubit. In other embodiments, the superconducting qubit is a superconducting charge qubit.

BRIEF DESCRIPTION OF THE DRAWINGS

FIG. 3A illustrates quantum state teleportation in accordance with the prior art.

FIG. 3B illustrates quantum gate teleportation in accordance with one embodiment of the present invention.

Like reference numerals refer to corresponding parts throughout the several views of the drawings.

DETAILED DESCRIPTION

Figure 1:
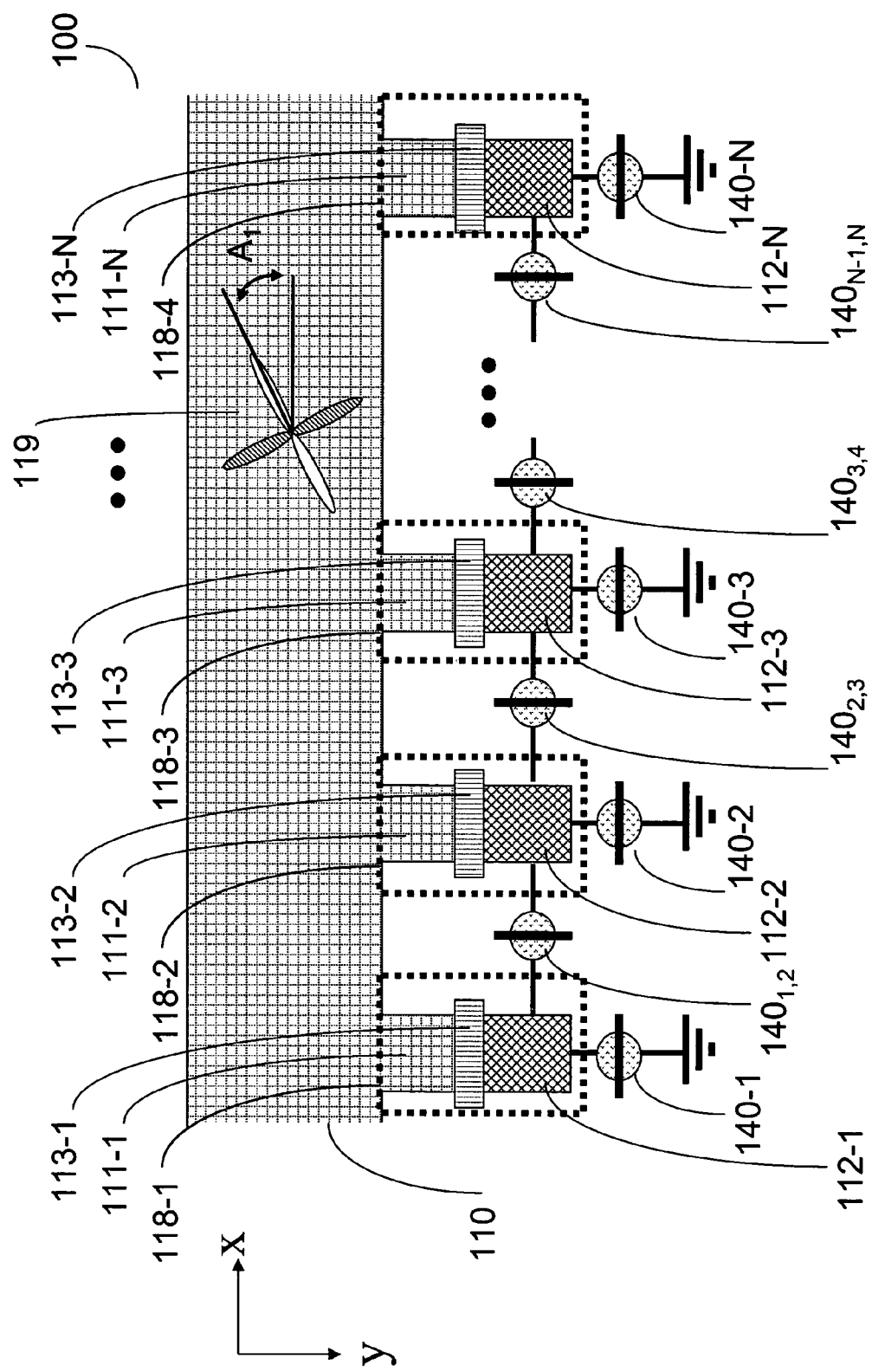
FIG. 1 illustrates a superconducting quantum register.

One aspect of the present invention provides methods for performing a single qubit gate teleportation in order to remove the necessity for hard-to-implement quantum gates in quantum computing devices such as quantum register 100 (FIG. 1). Such methods therefore alleviate the need for specialized hardware. For example, some embodiments of the present invention provide a method for single qubit gate teleportation in order to replace a Pauli Z gate. Therefore, the present invention allows for universal quantum computation using a reduced set of implementation constraints.

Embodiments of the present invention include a set of quantum logic gates that are universal while at the same time only employ control over exchange interactions and single- and two-qubit measurements. According to one aspect of the present invention, any single-qubit unitary operation includes a single-qubit gate teleportation. This single-qubit gate teleportation includes qubit-qubit interaction operations and measurement. Embodiments of the present invention thus eliminate difficulties in the construction of several devices for quantum computation, such as spin-coupled quantum dots, donor-atom nuclear spins in silicon, and electrons on helium. Advantageously, some embodiments of the present invention require no encoding redundancy. An example of systems where encoding is used to replace a biasing apparatus is U.S. Application Ser. No. 60/370,087 entitled, "Encoding and Error Suppression for Superconducting Quantum Computers," incorporated herein by reference in its entirety.

The present invention is applicable to all quantum-computing devices including, but not limited to, solid state, superconducting qubits, quantum dots, donor atoms in silicon, optics, NMR, and other systems whose behavior is characterized by quantum mechanics.

Qubits Used in the Single-qubit Gate Teleportation of the Present Invention

In one aspect of the present invention, single-qubit gate teleportation is used to apply a single-qubit Pauli Z gate (phase flip operation) to a superconducting qubit. One type of a superconducting qubit is a phase qubit. An example of a phase qubit includes, but is not limited to, the d-wave grain boundary qubit (e.g., Permanent Readout Superconducting Qubit). See, for example, U.S. Pat. No. 6,459,097 B1 entitled "Qubit using a Josephson Junction between s-Wave and d-Wave Superconductors," issued Oct. 1, 2002, and U.S. patent application Ser. No. 09/452,749, entitled "Permanent Readout Superconducting Qubit," which are hereby incorporated by reference in their entireties.

The superconducting qubit class also includes superconducting charge qubits. See, e.g., Shnirman and Schön, 1998, "Quantum measurements performed with a single-electron transistor," Physical Review B, 57:24, 15400–15407, which is hereby incorporated by reference in its entirety. Another superconducting qubit is the quasicharge qubit described in Cottet a al., 2002, "Implementation of a combined charge-phase quantum bit in a superconducting circuit," Physica C 367, 197, Proceedings of The International Symposium in Superconducting Device Physics (SDP 2001) Jun. 25–27, 2002, which is hereby incorporated by reference in its entirety. A review of superconducting qubits can be found in Makhlin et al., 2001, "Quantum-State Engineering with Josephson-Junction Devices," Reviews of Modem Physics Vol. 73, p. 357, which is hereby incorporated by reference in its entirety.

Systems Described by a Josephson Hamiltonian

One aspect of the present invention provides methods for single-qubit Pauli Z gate (phase flip operation) in quantum computing systems that can be described by a Hamiltonian that includes a Josephson Hamiltonian (e.g., register 100 of FIG. 1A). In other words, one aspect of the present invention provides methods for executing single qubit gate teleportation to perform a single-qubit Pauli Z gate (phase flip operation) for any coupling of the Ising type. An Ising coupling is characterized by the interaction Hamiltonian (Josephson coupling) $(H_{int})$ $\sigma^Z_A \sigma^Z_B$. Such an interaction describes the coupling of qubits A and B, for example, coupling Josephson qubits via SSETs (e.g., register 100 of FIG. 1A). See, for example, Falci et al., 2002, Nature 407, 355; Choi et al., 1998, Phys Rev. Lett. 81, 4240; Choi, 2001, Physical Review A 64 054301-1, which are hereby incorporated by reference in their entireties. The Josephson coupling $\sigma^Z \otimes \sigma^Z$ is one form of Ising-type coupling.

The system Hamiltonian of register 100 (FIG. 1A) may be written as:

$$H_S = H_X + H_Z + H_{ZZ},$$

where, $H_X = \Sigma_i \Delta_i(t) X_i$ describes a time dependent bit flip or (phase) tunneling, $H_Z = \Sigma_i b_i(t) Z_i$ is a time dependent phase flip, and $H_{ZZ} = \Sigma_i \Sigma_j J_{ij}(t) Z_i Z_j$ represents time dependent Josephson coupling (also termed a Josephson Hamiltonian or an Ising coupling) of all qubits i and j in system 100.

$X_i$, $Y_i$, $Z_i$ denote the Pauli operators (matrices) $\sigma^X$, $\sigma^Y$, $\sigma^Z$ acting on the qubit 118-$i$. For a two quantum state system, including qubits, the Pauli operators are:

$$\sigma^X = \begin{pmatrix} 0 & 1 \\ 1 & 0 \end{pmatrix}$$

$$\sigma^Y = \begin{pmatrix} 0 & -i \\ i & 0 \end{pmatrix}, \text{ and}$$

$$\sigma^Z = \begin{pmatrix} 1 & 0 \\ 0 & -1 \end{pmatrix}.$$

See, for example, Nielsen and Chuang, *Quantum Computation and Quantum Information*, Cambridge University Press (2000), p.65.

The system Hamiltonian $H_S = H_X + H_Z + H_{ZZ}$ describes the operation of many quantum registers including the two junction flux qubit. See, for example, U.S. Application Ser. No. 60/349,663, entitled "Two Junction Phase Qubit," filed Jan. 15, 2002 by Amin et al., which is hereby incorporated by reference in its entirety. Similar system Hamiltonians exist for other small capacitance Josephson junction qubits. For example, in two superconducting charge qubits coupled by an inductive circuit, the $H_{ZZ}$ term is replaced by $H_{YY}$ e.g. $\Sigma_i \Sigma_j G_{ij}(t) Y_i Y_j$. Alternative embodiments of quantum register can have a $H_{XX}$ term in place of either the $H_{ZZ}$ or $H_{YY}$ term. See Makhlin et al., 2001, "Quantum-State Engineering with Josephson-Junction Devices," Reviews of Modern Physics 73, p. 357, which is hereby incorporated by reference in its entirety. Like the Permanent Readout Superconducting Qubit, many Josephson junction qubits or superconducting qubits require specialized apparatus to implement certain single and two qubit gates.

The Pauli matrices can operate on the states of a qubit. The states of a qubit are expressed in terms of quantum basis states. In quantum computation, these quantum basis states are called qubit (or computational basis) states and are conventionally labeled |0> and |1>, which are analogous to bit values 0 and 1 found in classical computers. Basis states are the 2-vector eigenvectors or eigenstates of a Pauli matrix. In some instances, the |0> and |1> basis states represent two-vector eigenstates of the $\sigma^Z$ matrix, also known as the Z-diagonal basis.

The Pauli matrices can be used to describe unitary operators that are exponentiated weighted Hamiltonians. Such Hamiltonians can be used to evolve or transform the quantum basis states of a qubit. Such evolution or transformation is required in many quantum computing operations. For example, an example of a unitary operator is:

$$R_{j\alpha} = \exp(i\theta\sigma_j^\alpha),$$

where,

θ is a rotation angle around the a axis, and

α=I, X, Y, or Z.

Figure 2A:
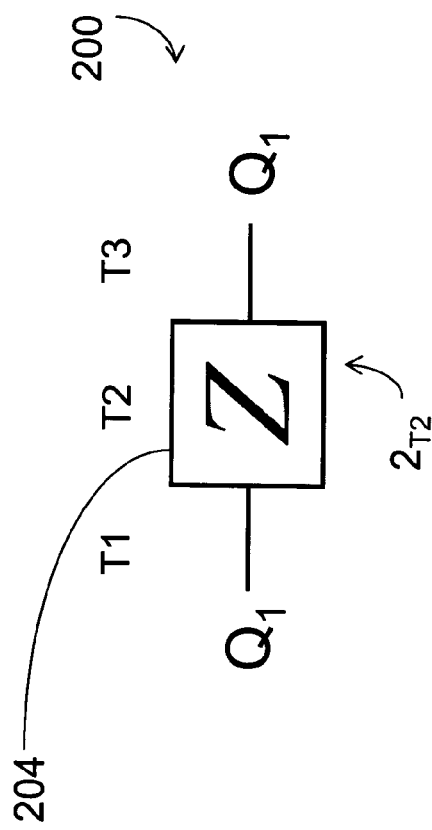
FIGS. 2A and 2B illustrate a single-qubit gate Z.
Figure 2B:
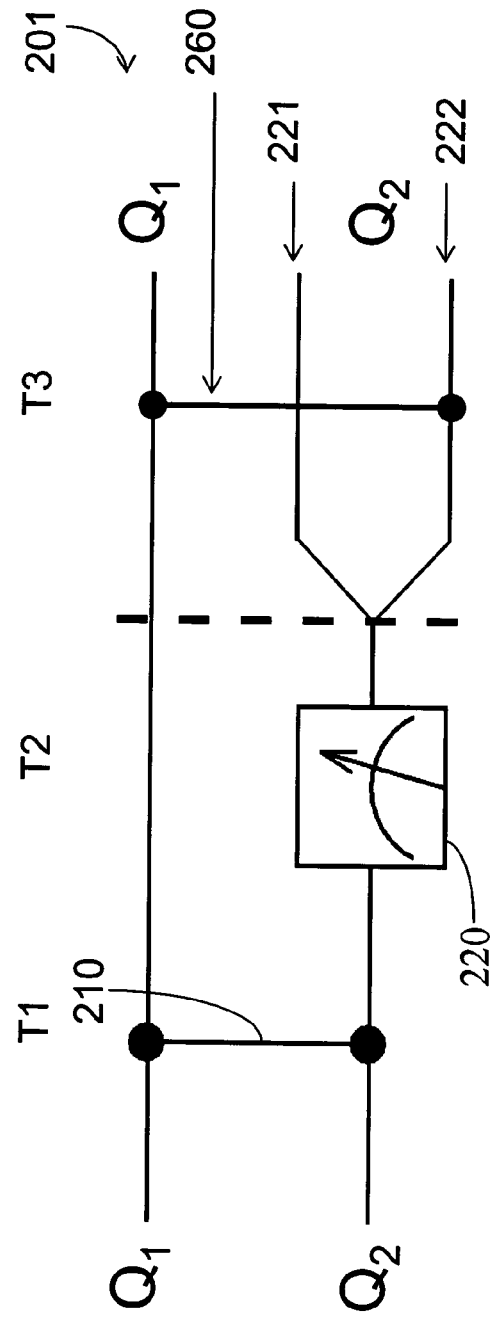
Figure 2C:
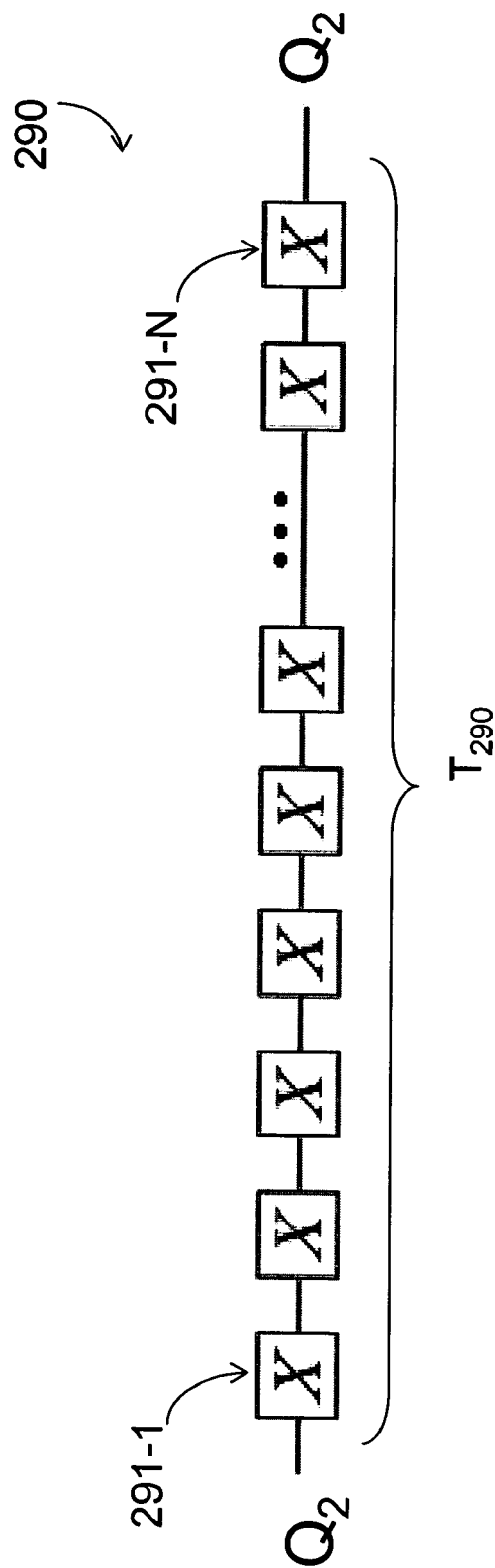
FIGS. 2C and 2D illustrate the placement of qubit $Q_2$ in an equal superposition state.

Referring to FIG. 2A, the single-qubit Pauli Z gate represents $R_{1Z}$ over time-step T2. FIG. 2C illustrates application of the standard X gate (291) operating on qubit Q2. X gate (291) is represented by $R_{2X}$ and corresponds to a rotation of the state of the qubit around the x-axis of the state space by θ. Both Hamiltonians and exponentiated Hamiltonians are well known and used in the art to describe the evolution of qubits. Hence, each of the single-qubit system Hamiltonian $H_S$ terms correspond to a respective Pauli matrix and can be controlled or operated on by the respective unitary operator.

Quantum computing further involves an interaction or coupling operation, in which the quantum states of two or more qubits become entangled. Typically, qubits can be coupled together in a pair-wise manner. Referring to FIG. 1, qubits 118-1 and 118-2, for example, can be coupled by modulating the state of switch $140_{1,2}$. Coupling of the form illustrated in quantum register 100 represents Josephson coupling. This is represented by the $H_{ZZ}$ term of the system Hamiltonian described above. Such a two qubit term is represented in the Hamiltonian by a $\sigma_i^Z \otimes \sigma_j^Z$ term, where the "$\otimes$" binary operator denotes the tensor product, such as $H_{ZZ} = \Sigma_i \Sigma_j J_{ij}(t) Z_i \otimes Z_j$ (or more compactly as $H_{ZZ} = \Sigma_i \Sigma_j J_{ij}(t) Z_i Z_j$) where J is the coupling coefficient between the two qubits. The term $J_{ij}(t)$ represents the time dependent coupling energy for respective qubits i and j in system 100 (e.g., qubits 118-1 and 118-2). This coupling energy is determined by the nature of the device used to couple qubits i and j (e.g., the nature of device $140_{1,2}$). More specifically, the coupling energy $J_{ij}$ is determined by fabrication considerations (e.g. Josephson junction thickness) and operating conditions (e.g., operating voltages) of device 140. As an example, in some embodiments of register 100, one or more coupling devices 140 are SSETs. Operation of a SSET is governed by a gate voltage. Setting this gate voltage to an operating range allows for the coupling of adjoining qubits i and j. The term $J_{ij}$ represents the coupling energy for this coupling. $J_{ij}$ is a two qubit term that acts on the direct product of the two states of the i-th and j-th qubit (e.g., qubit 118-1 and 118-2), having 2*2=4 components and thus represented by a 4×4 vector. In the $\sigma^Z$ basis the tensor product reads:

$$\sigma^Z \otimes \sigma^Z = \begin{pmatrix} 1 & 0 & 0 & 0 \\ 0 & -1 & 0 & 0 \\ 0 & 0 & -1 & 0 \\ 0 & 0 & 0 & 1 \end{pmatrix}$$

Only one of the terms $H_X$, $H_Z$, $H_{ZZ}$ can be on at any given time. See, for example, U.S. Patent Application Ser. No. 60/370,087 entitled, "Encoding and Error Suppression for Superconducting Quantum Computers," which is hereby incorporated by reference in its entirety. In some instances, turning on the bias or Josephson coupling is the only way to control the value of the tunneling matrix element. For example, referring again to FIG. 1, tunneling will occur for the quantum states of qubits 118-1 through 118-N in the idle state. Thus, for qubits 118 of register 100, such an idle state is treated as the application of an X gate. In the example of register 100, it would be desirable to reduce the constraints on fabrication by removing the possibility of applying bias $b_i$ on individual qubits.

Removing specialized bias systems for the system Hamiltonian $H_S$ described above will result in a new system Hamiltonian $H'_S = H_X + H_{ZZ}$. UQC can be performed given this Hamiltonian, by encoding a logical qubit into two physical qubits, and using sequences of recoupling pulses. In accordance with an aspect of the present invention, the single-qubit bias operation $Z_i$ includes using entanglement operations and measurement, hence making the system Hamiltonian $H'_S$ universal for quantum computation.

Single Qubit Gate Teleportation in Systems Described by a Josephson Hamiltonian

Systems described by a system Hamiltonian that includes a Josephson Hamiltonian interaction term were described in the preceding section. Physical examples of such systems include quantum register 100 (FIG. 1). One embodiment of the present invention provides a method for applying a Z gate (single-qubit Pauli Z gate) to a particular qubit, termed a "data" qubit. This method is called single-qubit gate teleportation. The method includes providing a data qubit, on which the Z gate is to be applied. Further, an additional qubit is used. This additional qubit is termed an ancillary qubit. The terms ancillary qubit, ancilla, and ancilla qubit are used interchangeably herein. In step (A) of the method, the ancilla qubit is placed in an equal superposition of basis states which are expressed as:

$$|I\rangle = (\mu|0\rangle + \nu|1\rangle)/\sqrt{2}$$

where,

μ and ν are both about equal in magnitude to 1.

Once the ancilla qubit is in the appropriate initial state, step (B) of the method calls for applying a Josephson gate, denoted $e^{-i\phi Z_1 Z_2/2}$, between the data qubit and the ancilla qubit. The goal of step (B) is to apply a Z gate to the data qubit. Application of this Josephson gate can best be understood by referring to register 100 (FIG. 1). Consider the case in which qubit 118-1 is the data qubit and qubit 118-2 is the ancillary qubit. Thus, 118-2 has been placed in an equal superposition of basis states. Next, to apply the Josephson gate between the data qubit and the ancilla qubit, device $140_{1,2}$ is set to an operating range that allows the data qubit (118-1) and the ancillary qubit (118-2) to couple. Because of the physical properties of device $140_{1,2}$, the coupling is a ZZ coupling. In the case where device $140_{1,2}$ is a SSET, application of the Josephson gate between the ancillary qubit and the data qubit is achieved by setting the SSET gate voltage to an operational voltage. This operational gate voltage permits coupling between the ancillary qubit and the data qubit, across the Josephson junctions of the SSET, for a period of time. The amount of time that the SSET is set to an operational (active, permissible) gate voltage is application dependent and the methods of the present invention place no intrinsic limitation on this time period.

In step (C) of the method, the quantum state of the ancilla qubit is measured to determine whether step (B) of the method resulted in the application of a Z gate to the data qubit. If this measurement returns a result of |0>, then a Z gate was successfully applied to the data qubit. In other words, application of the Josephson gate in step (B) of the method was sufficient to apply a Z gate to the data qubit. In such instances, the method is complete. If, on the other hand, the measurement in step (C) returns a result of |1>, then a Z gate was not successfully applied to the data qubit. When the Z gate was not successfully applied to the data qubit, the method calls for an additional step, step (D). In step (D), a correction pulse is applied to the data qubit. In one embodiment of the present invention, this correction pulse comprises applying a second Josephson gate, $e^{-i\phi Z_1 Z_2}$, between the data qubit and the ancilla qubit. The correction pulse takes advantage of the fact that the ancillary is in a known state. Based on knowledge of this known state and the Josephson coupling energy between the ancillary qubit and the data qubit, a coupling time period can be chosen that will result in the application of a Z gate to the data qubit. For example, in the case of FIG. 1, where qubit 118-1 is the data qubit and qubit 118-2 is the ancillary qubit, sufficient information is known about the system after step (C) to apply a Z gate to the data qubit. That is, the state of ancillary qubit 118-2 is known (|1>) and the Josephson coupling energy between qubit 118-1 and 118-2 is known. Based on this information a coupling time period, T2, necessary to apply a Z gate to the data qubit can be computed. In the case where device $140_{1,2}$ is a SSET, the gate voltage is set to a coupling (operational) voltage for time period T2. This will result in the successful application of the Z gate to the data qubit. Thus, it is possible to apply the Z gate to the data qubit regardless of the outcome of the initial measurement of the ancilla qubit in step (C).

The inventive method has been disclosed for systems that can be described by a Hamiltonian that includes a Josephson interaction Hamiltonian. The method will now be described using quantum circuit diagram 201 of FIG. 2B as a reference. FIG. 2B adheres to standard nomenclature for a quantum circuit diagram. Quantum circuit diagram 201 includes a data qubit $Q_1$ that is represented by line $Q_1$—$Q_1$. Quantum circuit diagram 201 further includes ancilla qubit $Q_2$ that is represented by line $Q_2$—$Q_2$. Time progresses from left to right in FIG. 2B. Q1 and Q2 are capable of being coupled using an Ising type coupling, such as an SSET (e.g., a parity key). Thus, the Hamiltonian that describes Q1 and Q2 includes a Josephson interaction term.

At time T1, qubit $Q_1$ and qubit $Q_2$ are coupled using Josephson gate 210. In embodiments where $Q_1$ and qubit $Q_2$ are coupled by a SSET, the Josephson gate 210 is applied by setting the gate voltage of the SSET to a coupling voltage (operational voltage) for a period of time. In some embodiments of the present invention, Josephson gate 210 includes controlling the coupling term $H_{ZZ}$ of the system Hamiltonian $H_S$ described above. Application of Josephson gate 210 has the effect of applying a Z gate or an $R_{1Z}$ operation on qubit $Q_1$. At time T2, qubit $Q_2$ is measured (FIG. 2B, step 220). Measurement 220 has two possible outcomes, 221 and 222. Outcomes 221 and 222 respectively reflect successful and unsuccessful application of the Z gate on the state of qubit $Q_1$. In other words, outcome 221 means that Josephson gate 210 applied a Z gate to qubit $Q_1$ and outcome 222 means that Josephson gate 210 did not apply a Z gate to qubit $Q_1$.

In cases where measurement 220 determines that Z gate 210 was not successful (outcome 222), a correction pulse 260 is applied between $Q_1$ and $Q_2$ at time T3. FIG. 2B illustrates correction pulse 260 connecting unsuccessful outcome 222 and data qubit $Q_1$. In some embodiments of the present invention, correction pulse 260 represents application of a Josephson gate, $e^{-i\phi Z_1 Z_2}$, which causes successful application of the Z gate on qubit $Q_1$. For example, in the case where a SSET is used to connect $Q_1$ and $Q_2$, application of the correction pulse involves setting the gate voltage of the SSET to a gate voltage that permits coupling between $Q_1$ and $Q_2$. The gate voltage of the SSET is set to the coupling voltage for a predetermined period of time. The length of the predetermined period of time is a function of the state of the ancillary qubit ($Q_2$) as well as the coupling energy of the SSET.

In some embodiments, the phase of correction pulse 260 represents twice the applied phase of Josephson gate 210. The phase of both the correction pulse 260 and the Josephson gate 210 is a function of the amount of time that the ancillary qubit and the data qubit are coupled as well as the coupling energy between the ancillary qubit and the data qubit. In some embodiments of the present invention, correction pulse 260 includes applying two Josephson gates 210 consecutively. In other embodiments, correction pulse 260 includes a Josephson gate applying twice the phase of Josephson gate 210. The applied phase of a Josephson gate depends on the embodiment of the invention and can be varied, for example, by controlling the duration or coupling energy.

In some embodiments of the present invention, a data qubit has a dedicated ancilla qubit. In other embodiments of the present invention ancilla qubits are shared (pooled) between data qubits. The determination of whether ancilla qubits are dedicated or shared will depend on the particular quantum circuit (e.g., quantum register) being used to implement the methods of the present invention.

In FIG. 2B, ancilla $Q_2$ and a data qubit $Q_1$ are nearest neighbors. However, the methods of the present invention are not limited to instances where the ancilla qubit and the data qubit are nearest neighbors. In fact, the technique of swapping can be used to move an ancilla qubit to a data qubits or vice versa. See, for example, U.S. application Ser. No. 09/782,886 entitled, "Optimization Method for Quantum Computing Process," filed Feb. 13, 2001, which is hereby incorporated by reference in its entirety. Some embodiments of the present invention include the use of swapping to reduce the number of ancilla qubits that are initialized such that they have an equal superposition of states.

Initial State of the Ancillary Qubit in Systems
Described by a Josephson Hamiltonian As described above, the inventive single-qubit gate teleportation methods, for systems described by a Hamiltonian that includes a Josephson Hamiltonian, require that the ancilla qubit be in a specific initial state. More specifically, the ancilla qubit must be in an equal superposition of quantum basis states. This initial state may be expressed |I>=(μ|0>+v|1>)/√2, where μ and v are both about equal in magnitude to 1. In one embodiment, this initial state is achieved by successive application of an X gate (single-qubit Pauli X gates) to the ancilla qubit, as described in further detail below.

In some embodiments of the present invention, an ancilla qubit is prepared in an appropriate initial state by isolating the ancilla qubit for a duration t. This duration t (amount of time, time period) is correlated with the tunneling frequency Δ of the ancilla qubit in accordance with the relationship $$t \approx \frac{h}{\Delta}\frac{\pi}{2},$$

where h is Planck's constant. That is, t is about $$\frac{h}{\Delta}\frac{\pi}{2}.$$

In some instances, t is about $$\frac{h}{\Delta}\frac{\pi}{2}$$

when $$\left(0.9 \times \frac{h}{\Delta}\frac{\pi}{2}\right) \le t \le \left(1.1 \times \frac{h}{\Delta}\frac{\pi}{2}\right).$$

FIG. 2C illustrates a method used to prepare ancilla qubit $Q_2$, in accordance with one embodiment of the present invention. Here, X gates 291-1 through 291-N are applied to the state of ancilla qubit $Q_2$. In some embodiments of the present invention, preparation of the initial state of the ancilla qubit includes isolating ancilla qubit $Q_2$ for a period $T_{290}$. Period $T_{290}$ is approximately the inverse of the tunneling frequency Δ of ancilla qubit $Q_2$. The exact value of the tunneling frequency Δ of ancilla qubit $Q_2$ depends on the characteristics of the quantum computer being used to implement the methods of the present invention. One exemplary method that can be used for determining Δ is to perform calibration using quantum process tomography. See, for example, Childs et al., 2000, "Realization of quantum process tomography in NMR," LANL preprint quant-ph/0012032, which is hereby incorporated by reference in its entirety. In this calibration, one performs measurements on a qubit in several different states.

Figure 2D:
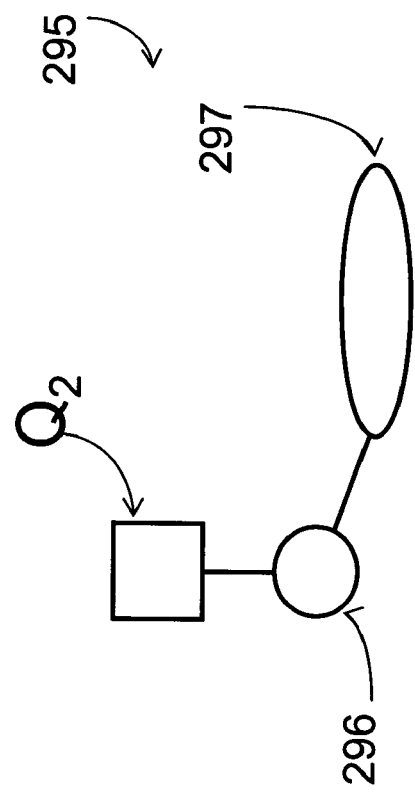

FIG. 2D illustrates another embodiment of the present invention that can be used to place the ancilla qubit in the appropriate initial state in systems that are described by a system Hamiltonian that includes a Josephson Hamiltonian. In this embodiment, the initial state is achieved by isolating ancilla qubit $Q_2$ and permitting tunneling to occur between the basis states of qubit $Q_2$ as it is cooled. In one embodiment (illustrated in FIG. 2D), ancilla qubit $Q_2$ is cooled by heat pump 296. Heat pump 296 is connected to a heat bath 297. Exemplary heat pumps 296 include magnetic fields that use a process known as field cooling. Advantageously, in many quantum computers, process 295 (FIG. 2D) does not require any additional resources because most qubits require cooling in order to perform quantum computation. Thus, cooling mechanisms, such as heat pump 296, are typically already present in most quantum computers. To summarize, methods used to prepare the initial state of the ancilla qubit will depend on the characteristics of the quantum computer used to implement the methods of the present invention.

Systems Described by an Exchange Hamiltonian

Some quantum computing structures used by the methods of the present invention can be described with an exchange Hamiltonian $H^{ex}$. The exchange Hamiltonian is different from the system Hamiltonian $H_S$. Exchange Hamiltonian $H^{ex}$ is an expansive example of a coupling Hamiltonian. Systems described by an exchange Hamiltonian are often referred to as exchange-based quantum computers. The exchange Hamiltonian can be expressed as:

$$H_{ij}^{ex}(t) = J_{ij}^{\perp}(t)(X_iX_j + Y_iY_j) + J_{ij}^{z}(t)(Z_iZ_j)$$

where, $J_{ij}^{\perp}$ is a time dependent coupling strength of the Hamiltonian expressed as the sum of the XX tensor product and the YY tensor product, where Xi, Xj, Yi, and Yj are the Pauli matrices acting on each respective qubit i and j in the system; and $J_{ij}^{z}$ is the time dependent coupling strength that represents time dependent Josephson coupling (also termed a Josephson Hamiltonian or an Ising coupling) of qubits i and j.

Some systems used by the methods of the present invention are described by an exchange Hamiltonian where $J^z = 0$. Such systems are denoted XY Hamiltonian systems. Examples of XY Hamiltonian systems include, but are not limited to, quantum dots and atoms in cavities. See, for example, Imamoğlu et al., 1999, Phys. Rev. Lett. 83, 4204; and Zeng, 2000, Phys. Rev. Lett 85, 2392, which are hereby incorporated by reference. Other systems used by the methods of the present invention are described by an exchange Hamiltonian where $J^{\perp} \ne 0$. Such systems are denoted XXZ Hamiltonians. Examples of XYZ Hamiltonian systems include electrons on helium. See, for example, 1999, Platzman and Dykman, Science 284, 1967. The classification of various quantum computing systems, by Hamiltonian, is described in Lidar and Wu, 2002, "Reducing Constraints on Quantum Computer Design by Encoded Selective Recoupling," Physical Review Letters 88, 017905, and in particular Table 1, which is hereby incorporated by reference in its entirety. According to aspects of the present invention, the exchange coupling strength for the $\sigma^X$ and $\sigma^Y$ terms ($J^{\perp}$) can be varied during the operation of the quantum computer.

The exchange Hamiltonian $H^{ex}$ provides a complete model for many examples of quantum computers. The full form of the exchange Hamiltonian generates a two-qubit unitary operator or two-qubit gate $$U_{ij}^{EX}(\varphi^{\perp}, \varphi^z) = \begin{bmatrix} e^{-i\varphi^z} & & & \\ & e^{i\varphi^z}\cos(\varphi^{\perp}) & -ie^{i\varphi^z}\cos(\varphi^{\perp}) & \\ & -ie^{i\varphi^z}\cos(\varphi^{\perp}) & e^{i\varphi^z}\cos(\varphi^{\perp}) & \\ & & & e^{-i\varphi^z} \end{bmatrix}$$

Unitary operators are exponentiated time integrals of Hamiltonians, for example $U_{ij}^{EX}(\varphi^{\perp}, \varphi^z) = \exp(-i\int H_{ij}^{ex}(t')dt')$. Here $\varphi^{\perp} = \int J^{\perp}(t')dt'$, $\varphi^z = \int J^z(t')dt'$ and the units are normalized (i.e.

h=1). This unitary gate $U_{ij}$ is sufficient for two qubit operations. See requirements established in Dodd et al., 2001, "Universal quantum computation and simulation using any entangling Hamiltonian and local unitaries," LANL preprint quant-ph/0106064, which is hereby incorporated by reference in its entirety. $U_{ij}$ combined with a set of two fixed rotation single qubit operators is sufficient for universal quantum computation. An example of a pair of fixed rotation single qubit unitary operators is $$R_{j\beta} \equiv \exp\left(i\frac{\pi}{4}\sigma_j^\beta\right)$$

where $\beta=X$ or $Z$ and $j$ is the qubit index. The rotation is fixed at $\pi/4$. An example of another pair of operators is where $\beta=Y$ or $\beta=Z$. The operation $R_{i\beta}$ has fixed $\pm\pi/4$ rotation but embodiments of the present invention exist where the fixed rotation amount is of a magnitude other than $\pi/4$.

Single Qubit Gate Teleportation in Systems Described by an Exchange Hamiltonian The preceding section disclosed systems that are described by an exchange Hamiltonian. This section describes methods that can be used to perform a single qubit gate teleportation on systems that are described by an exchange Hamiltonian. Such methods are described in conjunction with FIG. 3B. FIG. 3B illustrates a quantum circuit 350 including a data qubit 361, a first ancilla qubit 362, and a second ancilla qubit 363. In the method, ancilla qubits 362 and 363 are entangled. The specific entangled state that qubits 362 and 363 are placed in is system dependent. The method further includes an exchange interaction $H_{23}^{ex}$ and a measurement.

In one embodiment of the present invention, the entangled state of ancilla qubits 362 and 363 is $|U_\beta\rangle \equiv (I \otimes U\sigma^\beta)(|00\rangle+|11\rangle)/\sqrt{2}$, where $I$ is the identity matrix, and $U$ is a general unitary gate, and $\beta=I$, X, Y, or Z. Label 370 in FIG. 3B denotes the entangled state of ancilla qubits 362 and 363. Initially, the sender of the Z gate, Alice, has possession of qubit 361, with a quantum state $|\psi\rangle$, and qubit 362 from the entangled state, while Bob (the receiver) has possession of qubit 363 from the entangled state. Alice measures qubits 361 and 362 (step 331), obtaining one of four possible outcomes; 00, 01, 10, or 11, denoted $\alpha$ (FIG. 3B). The indices $\alpha$ (from step 331) and $\beta$ (from the initial state of ancilla qubits) can be equally regarded as indexing the ordered sets: the measurement outcome on qubits 361 and 362 {00, 01, 10, or 11} or the Pauli matrices {I, X, Z, Y}. Alice communicates $\alpha$ to Bob on classical open channel 390. It is with probability about ¼ that Alice finds $\alpha=\beta$ at 331, in which case the desired single qubit operation has successfully been teleported to Bob at 332. Thus, the desired result has been obtained and the output state is $U_\beta|\psi\rangle$. However, with a complementary probability of about ¾ Alice finds $\alpha\neq\beta$ at 331 and Bob, at 332, must apply a correction operation. An example of a correction operation is $M_{\alpha\beta}$, where, $M_{\alpha\beta}=U_\beta\sigma^\alpha\sigma^\beta U^\dagger_\beta$, and, $\alpha\neq\beta$, and $\alpha$ and $\beta$ are indices to ordered sets: {00, 01, 10, or 11} and {I, X, Z, Y}.

The result is state $U|\psi\rangle$ on qubit 363. The unitary gate U has been teleported to qubit 363. For every unitary operator U there exists the operator $U^\dagger$ defined by $U^\dagger U=1$ and is called U's Hermitian conjugate. In some embodiments of the present invention, the correction operation is performed by teleporting $M_{\alpha\beta}$ through a recursion of exchange 350, where $U_\beta$ is replaced with $M_{\alpha\beta}$. In some embodiments of the present invention the process succeeds with a mean of four iterations.

In accordance with embodiments of the present invention, a method for single-qubit gate teleportation, in which an input quantum state $|\psi\rangle$ is transformed to an output state $U|\psi\rangle$, and in which the quantum register has an exchange Hamiltonian $H^{ex}$, includes providing a first and second ancilla qubit having an entangled initial state $|U_\beta\rangle$ and a data qubit, performing a measurement on the first ancilla qubit and the data qubit to obtain a result, and applying a single qubit operation on the second ancilla qubit dependent on the result of the measurement. In some embodiments of the present invention, the single-qubit gate teleportation includes one or more correction steps. The roles of the data qubit and the first and second ancilla qubits are dynamic and interchangeable.

In accordance with an embodiment of the present invention, a correction pulse includes a sequence of one or more measurements applied to two of the three qubits. In some embodiments of the present invention, the measurement sequence includes two measurements or less. A first measurement is applied to the data qubit and the first ancilla qubit, and a second measurement is applied to the first ancilla qubit and the second ancilla qubit. The single-qubit gate teleportation has a probability of being successful after each measurement step. Hence, in some cases, both corrective iterations are not necessary.

An embodiment of the present invention provides a method for preparing the initial state of the first and the second ancilla qubits. The method includes applying an exchange interaction between the first and second ancilla qubits and allowing the ancilla qubits to relax to a ground state $|S\rangle=(|01\rangle-|10\rangle)/\sqrt{2}$. Either the first ancilla qubit or the second ancilla qubit are measured to yield either $|01\rangle$ or $|10\rangle$. A $\pi/8$ exchange interaction pulse is applied to introduce a phase difference $\phi$ about equal to $\pi$, e.g. $\exp(i\pi)=i$, between the states. Details of the $\pi/8$ exchange interaction pulse depend on the embodiment of the invention. Methods for cooling depend on the embodiment of the invention, but can be achieved through a variety of known methods and devices. See, e.g., Kane in Braunstein and Lo (eds.), *Scalable Quantum Computers*, Wiley-VCH Verlag GmbH, Berlin (2001), pp. 253–1271, which is hereby incorporated by reference in its entirety.

Figure 4A:
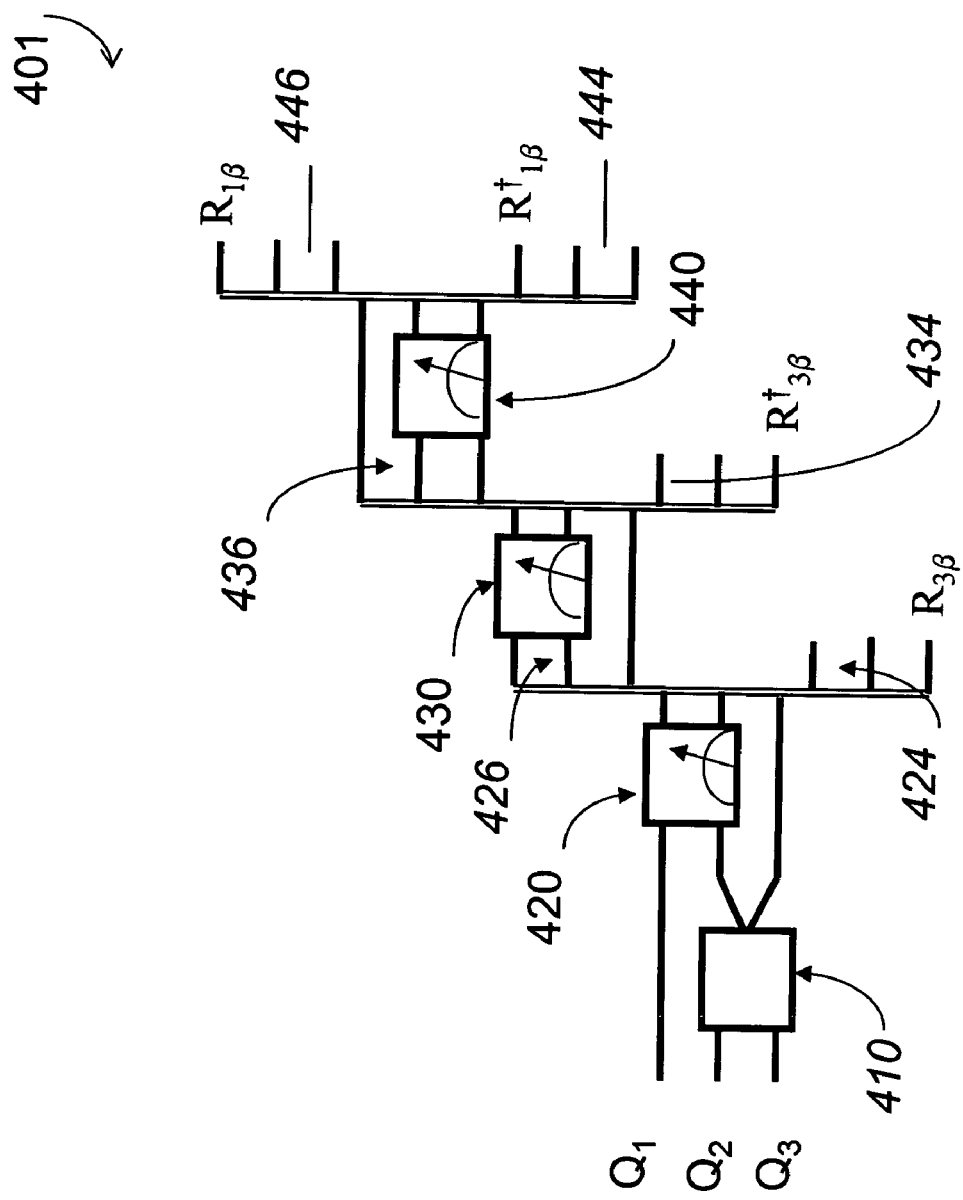
FIG. 4A illustrates a quantum gate teleportation process in accordance with one embodiment of the present invention.

FIG. 4A illustrates an embodiment of the present invention for single-qubit gate teleportation using quantum circuit 401. Embodiments of the present invention make use of quantum circuit 401 to implement fixed rotation (e.g. $\theta=\pi/4$) single qubit gates, such as $$R_{j\beta} \equiv \exp\left(i\frac{\pi}{4}\sigma_j^\beta\right),$$

for example. Quantum circuit 401 includes a data qubit $Q_1$ having an arbitrary input state, $|\psi_1\rangle=a|0\rangle+b|1\rangle$ and two ancilla qubits $Q_2$ and $Q_3$. Ancilla qubits $Q_2$ and $Q_3$ are prepared in an entangled state 410 as described above in detail. In application, Alice (the sender) can make a measurement 420 of qubits $Q_1$ and $Q_2$ (FIG. 3B).

Embodiments of the present invention, such as the embodiment disclosed in FIG. 4A, make use of observable results of applied operators. Such observable results are eigenvalues of applied operators. Applied operators that are typically used in such embodiments include, but are not limited to, the $\sigma_X$ operator, the $\sigma_Z$ operator, the $\sigma^1_X \otimes \sigma^2_X$ operator, and the $\sigma^1_Z \otimes \sigma^2_Z$ operator. Each of these applied operators correspond to one or two-qubit measurements in a particular basis. In one example, measuring the observables of the $\sigma_X$ basis can be regarded as a projective measurement into the basis defined by the eigenvectors of the $\sigma_X$ operator. In another example, measuring the observables of the $\sigma_Z$ basis can be regarded as a projective measurement into the basis defined by the eigenvectors of the $\sigma_Z$ operator, which are the standard qubit basis states. Likewise, measurement of observables of the $\sigma^1_Z \otimes \sigma^2_Z$ operator can be regarded as a projective measurement in the standard qubit basis. This projective measurement can be regarded as determining whether the spins of a first and second qubit are parallel or anti-parallel to $|0\rangle$ and $|1\rangle$. For the operator $\sigma^1_X \otimes \sigma^2_X$, measurement can be regarded as determining whether the spins of a first and second qubit are parallel or anti-parallel to states $|0\rangle+|1\rangle$ and $|0\rangle-|1\rangle$. These states are labeled $|+\rangle$ and $|-\rangle$, respectively.

In an embodiment of the present invention, an instance of a two qubit (qubit i and j) measurement $S^2_{ij}$ is made and this measurement has eigenvalues, and therefore observable S(S+1). If a measurement of two qubits is made, there are two possible outcomes, (i) an observable of 1 (e.g. S=0) and, (ii) an observable of 2 (e.g. S=1). Herein, the reference to a result from a two-qubit measurement refers to the eigenvalue being 1 or 2, (S being respectively 0, or 1). Significantly, this measurement distinguishes between a two-qubit singlet state, $(|0\rangle-|1\rangle)/\sqrt{2}$, and a two-qubit triplet state, $(|0\rangle+|1\rangle)/\sqrt{2}$.

In an embodiment of the prevention invention, the measurement of a data qubit and an ancillary qubit upon implementing a fixed rotation single qubit unitary operator, where β=Z, determines whether these qubits are in a singlet or triplet state. In the case of circuit 401, observation of the singlet state is represented as the lower state (e.g., state 424, 434 or 444). In an embodiment of the prevention invention, the measurement of a data qubit and an ancilla qubit upon implementing a fixed rotation single qubit unitary operator, where β=X determines whether these qubits are in a singlet state (a bottom state of FIG. 4A) or triplet state (an upper state of FIG. 4A). Here, the singlet state and the triplet state are respectively the anti-symmetric and symmetric combinations of the eigenstate of the $\sigma_X$ operator.

The goal of the embodiment depicted in FIG. 4A is to apply a single-qubit gate to a quantum state. At least initially, this quantum state is on data qubit $Q_1$. However, as the method progress, the quantum state can transfer to the second ancillary qubit $Q_2$ and, potentially, back to the data qubit. However, the physical location of the quantum state is not significant in this embodiment of the invention. What is significant is whether or not the desired single-qubit gate has been applied to the quantum state. Once the single-qubit gate has been applied to the quantum state, the quantum state can be moved to the desired qubit. The embodiment begins with measurement 420 of the data and ancillary qubits ($Q_1$ and $Q_2$). Measurement 420 can be a weak measurement. A weak measurement only partially collapses the state of the measured qubit and hence provides only a probabilistic result. The use of a weak measurement in circuit 401 advantageously allows for the preservation of the quantum state to which a single-qubit gate is to be applied. After measurement 420, the quantum state of $Q_3$ is relevant because $Q_3$ was entangled with $Q_2$ prior to application of the unitary operator. Further, after measurement 420, the quantum state that was initially on data qubit $Q_1$ is now on $Q_3$. The question is whether measurement 420 successfully applied the single-qubit gate to the quantum state that is now on qubit $Q_3$.

Measurement of one qubit of an entangled pair of qubits allows for the determination of the state of the other qubit. Weak measurement 420 results in Alice having probabilistic information regarding the total spin (state) data of data qubit $Q_1$ and first ancillary qubit $Q_2$. This probabilistic information comprises whether $Q_1$ and $Q_2$ are in a singlet or triplet state. The probability that the result of weak measurement 420 is a singlet state indicating successful teleportation of the single-qubit gate 424 to the state of $Q_3$ is about ¼. Accordingly, the probability that the teleportation was not successful and one or more correction steps must be taken is about ¾.

In some embodiments of the present invention, a first correction step (430) comprises weakly measuring data qubit $Q_1$ and first ancillary qubit $Q_2$ (measurement step 430). Correction step 430 determines a second result with two possible outcomes (outcomes 434 or 436). Outcome 434 indicates the successful teleportation of the Hermitian conjugate of the desired single-qubit operation to the quantum state that is now on the second ancillary qubit $Q_3$. Outcome 434 is manifested as the observation of the singlet state for qubits $Q_1$ and $Q_2$. Outcome 434 is considered successful because the Hermitian conjugate can be corrected and hence the desired result (application of the single-qubit operation) can be achieved on the quantum state that is now on qubit $Q_3$ without ever directly applying a one-qubit gate to the quantum state. Moreover, once the one-qubit gate has been applied to the quantum state, which is now on qubit $Q_3$, the quantum state can be teleported to qubit $Q_1$, if desired. Such a teleportation serves to apply the one-qubit gate to the quantum state that was initially on qubit $Q_1$ prior to weak measurement 420 without ever applying the one-qubit gate to the quantum state of $Q_1$.

Outcome 436 is manifested as an observation of the triplet state for qubits $Q_1$ and $Q_2$. Outcome 436 indicates that the correction step 430 (weak measurement 430) was not successful in applying the one-qubit gate to the quantum state that was on qubit $Q_1$ prior to measurement 420. If outcome 436 is achieved, a second correction step (440) is needed to apply the one-qubit gate to the quantum state that is now on qubit $Q_3$. Step 440 comprises measuring the state of first ancillary qubit $Q_2$ and second ancillary qubit $Q_3$. Step 440 causes the quantum state that is on qubit $Q_3$ to transfer to qubit $Q_1$. Step 440 will result in either successful teleportation of the desired single-qubit operation to the quantum state (now on data qubit $Q_1$) (446) or the Hermitian conjugate of the desired single-qubit operation to data qubit $Q_1$ (444). Note that the state that was on data qubit $Q_1$ prior to measurement 420, and was on the second ancillary qubit $Q_3$ after measurement 420 and measurement 430, is on the data qubit $Q_1$ after weak measurement 440. The correction of the Hermitian conjugate of the desired single-qubit operation 444 to the desired single qubit operation 446 can be achieved without directly applying a one-qubit gate to the quantum state that is now on qubit $Q_1$. In some embodiments of the present invention, the correction to the Hermitian conjugate of the desired single-qubit operation 444 is made by iterating process 401 and reversing the decision rule. In other words, reversing the action taken after correction steps 430 and 440 such that correction step 430 is only applied when state 424 is observed, correction step 440 is only applied when state 434 is observed, and Hermitian conjugates are reversed only when states 436 and 446 are observed.

An embodiment of the present invention includes the use of a correction pulse to implement a correction step. Embodiments of the invention can apply a coupling of qubits $Q_j$, where j=1,3 and $Q_2$ so as to avoid the repeating of measurements. Embodiments of the present invention can apply, $$U^{EX}_{j2}(\pi/2,0)$$

where, $U^{EX}_{j2}$ is the exchange two-qubit unitary operator.

The coupling takes the Hermitian conjugate of the desired operation $R^{554}_{j\beta}$ to the desired single-qubit operation $R_{j\beta}$. Embodiments of the present invention include a correction pulse of the Hamiltonian XY type, where $J^Z=0$. Embodiments of the present invention include a correction pulse of the XXZ Hamiltonian type, where $J^Z$ is tunable. These Hamiltonians can generate the coupling $U^{EX}_{j2}(\pi/2,0)$ and take $R^\dagger_{j\beta}$ to $R_{j\beta}$. This is the desired operation performed on the qubit indexed as j. In embodiments of the present invention, this correction pulse can be used instead of corrective measurements 430 and 440. In embodiments of the present invention, this correction pulse can be used instead of repeating circuit 401 and reversing the decision rules. The expectation value for the number of steps a correction pulse comprised of the exchange two-qubit unitary operator is 1.

Figure 4B:
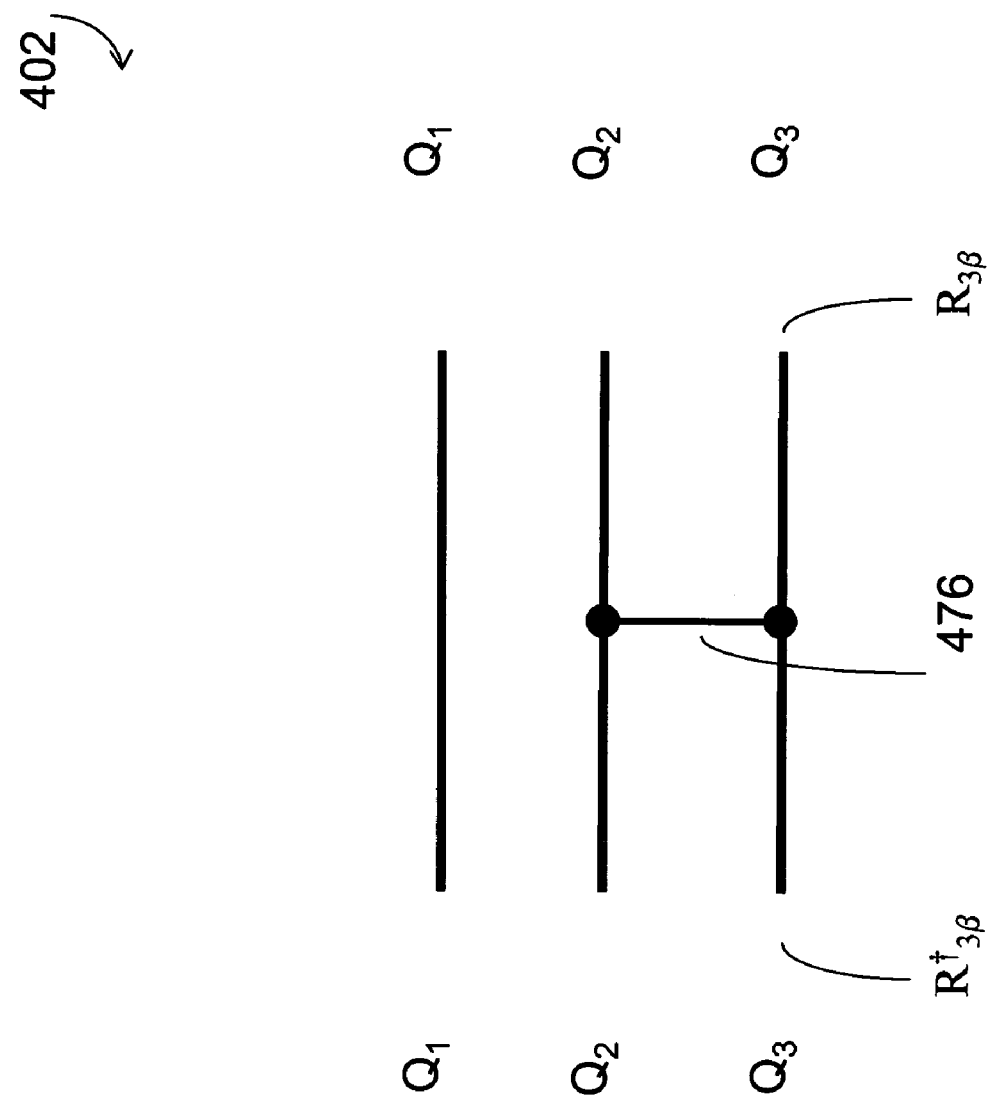
FIG. 4B illustrates a corrective operation to convert the Hermitian conjugate of a desired single-qubit gate to the desired single-qubit gate.

FIG. 4B illustrates an embodiment of the present invention that includes the use of a correction pulse to implement a correction step. In an embodiment of the invention circuit 402 of FIG. 4B replaces 430 and subsequent steps in quantum circuit 401 (see FIG. 4A). Quantum circuit 402 is comprised of qubits $Q_1$, $Q_2$, and $Q_3$. The embodiment depicted in FIG. 4B is invoked when weak measurement 420 of FIG. 4A indicates that the Hermitian conjugate of the desired operation ($R^\dagger_{3\beta}$) has been performed on the quantum state (desired state 426), which is on qubit $Q_3$ after weak measurement 420. When this occurs, the first ancillary qubit ($Q_2$) and the second ancillary qubit ($Q_3$) are coupled 476 as illustrated in FIG. 4B thereby taking the gate applied on the quantum state of qubit $Q_3$ to $R_{3\beta}$. For an embodiment of the present invention with an exchange Hamiltonian with $J^Z=0$ (XY) the coupling $U^{EX}_{3,2}(\pi/2,0)$ takes $R^\dagger_{3\beta}$ to $R_{3\beta}$. Therefore, the correction procedure occurs in a single step unlike the embodiment depicted in FIG. 4A. The expectation value for the number of steps to perform gate $R_{3\beta}$ is 1¾.

An embodiment of the present invention includes the use of a correction pulse to implement a correction step. Embodiments of the invention can apply a coupling of qubits $Q_1$, and $Q_2$ after two measurements thereby avoiding a third measurement. Embodiments of the present invention can apply, $$U^{EX}_{1,2}(\pi/2, 0) = \begin{bmatrix} 1 & & & \\ & -1 & & \\ & & -1 & \\ & & & 1 \end{bmatrix}$$

where, $U^{EX}_{1,2}$ is the exchange two-qubit unitary operator. The coupling takes the Hermitian conjugate of the desired operation to the desired single-qubit operation on the data qubit $Q_1$. For example, consider an exchange Hamiltonian of the XXZ type with $J^{195}$ (t) and $J^Z(t)$ both being tunable quantities. Therefore, $J^Z$ is tuned to about zero such that $\phi^Z$ is about zero.

In some embodiments of the present invention, measurements 420, 430, and 440 are weak measurements. As is well known in the field quantum mechanics, a weak measurement is a measurement that provides a probabilistic result, hence only partially collapsing the state of the respective qubit. In particular, a weak measurement is implemented using a weak coupling of the qubit and the measurement apparatus. Weak measurements are known and described in the art. See Averin, "Quantum Nondemolition Measurement of a Qubit," Physical Review Letters 88, 201901 (2002); Maassen van den Brink, "Quantum-efficient charge detection using a single-electron transistor," Europhysics Letters 58, pp. 562–568 (2002); Korotkov, "Selective quantum evolution of a qubit state due to continuous measurement," Physical Review B 63, pp. 115403 (2001); Korotkov, 1999, "Continuous quantum measurement of a double dot," Physical Review B 60, pp. 5737–5742, each of which is hereby incorporated by reference in its entirety.

Selective Recoupling and Rotation

Figure 5:
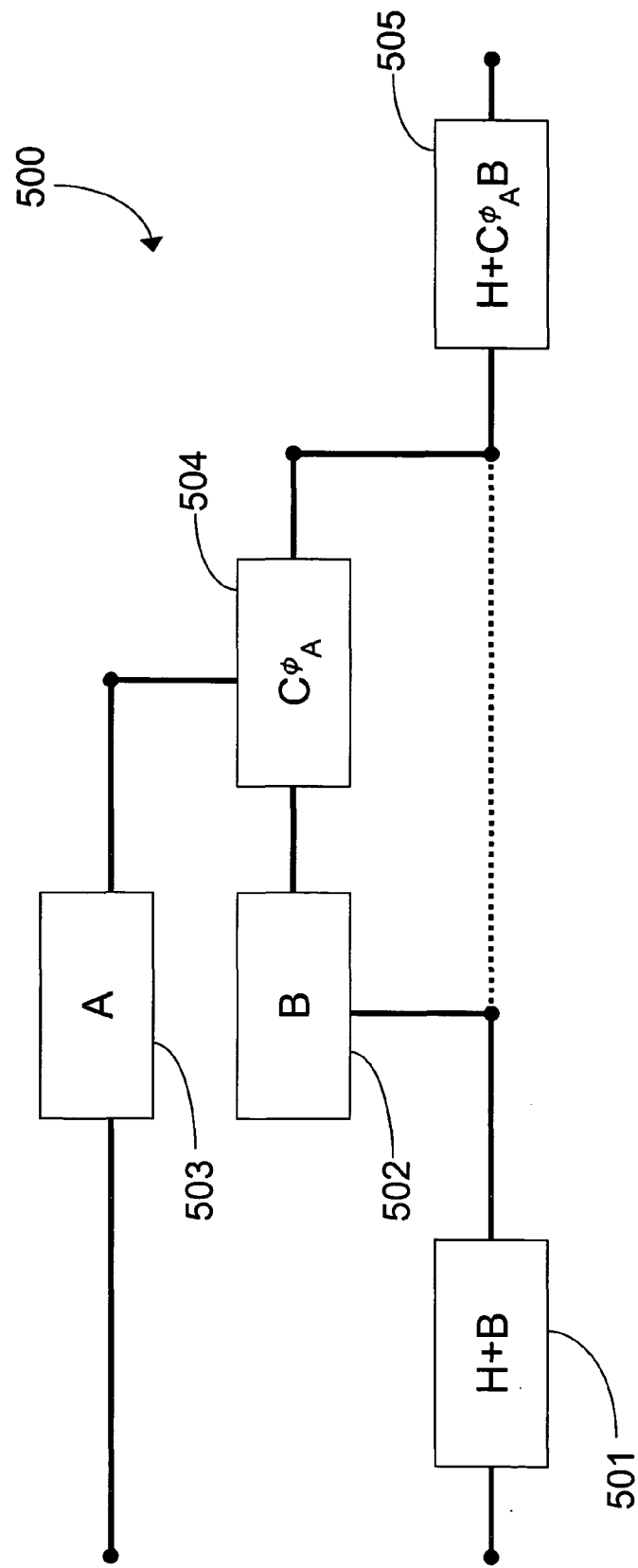
FIG. 5 illustrates the process of selective recoupling and rotation in accordance with one embodiment of the present invention.

FIG. 5 illustrates a generic embodiment of the process of selective recoupling and rotation. Selective recoupling and rotation are well known from the field of Nuclear Magnetic Resonance (NMR). Starting with step 501, the Hamiltonian of the system is divided into the desired and undesired components, H and B, respectively. The B term is an error term, corresponding to the physical interaction of the register with its environment or with itself. In some embodiments of the present invention, B is a term that is to be altered. In accordance with the given embodiments of the present invention, H and B are expressed as a weighted sum of one and two qubit operators. Next, in step 502, B is determined and for the moment H is disregarded. The recoupling pulse for B, here labeled A, is based on the available controllable interaction in the given quantum register and is determined in step 503. The terms of A should commute with the terms of H. In the examples described in detail above, A is the Josephson coupling proportional to $\sigma^Z_i \otimes \sigma^Z_j$, a tunneling term proportional to $\sigma^X$, a phase flip term proportional $\sigma^Z$, or an exchange term such as $H^{ex}_{ij}$. The term B is "conjugated by A" in step 504 as detailed below. Step 504 involves a suitably chosen angular parameter $\phi$, whose function is also explained below. The act of conjugation by A physically corresponds to letting the interaction represented by the operator A act on the system for a specific amount of time t. The amount of time t depends on the embodiment of the invention. The result of the process is seen in step 505 whereby the system had its error term conjugated by A. This method can be used with teleported single and two qubit quantum gates.

The afore-mentioned conjugation by A, process 504 of FIG. 5, is modeled as follows. Let A and B be anticommuting Hermitian operators where $A^2=I$. Then, the operation is:

$$C_A^\varphi \circ \exp(i\theta B) \equiv \exp(-i\varphi A)\exp(i\theta B)\exp(i\varphi A)$$

$$= \begin{cases} \exp(-i\theta B) \text{ if } B\varphi = \pi/2 \\ \exp(-i\theta(iAB)) \text{ if } \varphi = \pi/4 \\ \exp(i\theta B(I+iA)/\sqrt{2}) \text{ if } \varphi = \pi/8 \end{cases}$$

The result of this equation with $\phi=\pi/2$ is used in the NMR technique of refocusing, or more generally, selective recoupling. It allows one to flip the sign of a term in a Hamiltonian, which can be used to cancel unwanted evolution. In that case, error that is expressed in the operator B is symmetrically cancelled. Additionally, the result with $\phi=\pi/4$ is a rotation, specifically a special case of Euler angle rotations which preserves a discrete symmetry group (commonly the Pauli group in quantum computation). It is another, and in some examples optional, operation that affords universal computation i.e. generates the group SU(2). The case where $\phi=\pi$ allows for the creation of terms in the so-called group algebra of the Pauli Group (linear combinations of Pauli group elements). Additionally these are the basis of fault-tolerant quantum computing. See, for example, Nielsen and Chuang, 2000, *Quantum Computation and Quantum Information*, Cambridge Univ. Press.

Embodiments of the present invention implement time reversals without switching the sign of the operator. In order to implement $e^{-itA}$, a necessary operation in step 504 of process 500, where A is a Hamiltonian that is turned on for a time t, one needs to find v such that $e^{ivA}=I$ and implement $e^{i(v-t)A}$ instead. For example $A=J_{12}\sigma^Z_1 \otimes \sigma^Z_2$ one has $v=2\pi/J_{12}$, so that $\exp(-it(-J_{12})\sigma^Z_1 \otimes \sigma^Z_2)=\exp(i(t-2\pi/J_{12})J_{12}\sigma^Z_1 \otimes \sigma^Z_2)$. In the given example, if this Hamiltonian is applied (a pulse) for a time (duration) $t-2\pi/J_{12}>0$ it effectively evolves as if $J_{12}\rightarrow -J_{12}$. This method circumvents the need for switching the sign of the Hamiltonian itself.

Figure 6A:
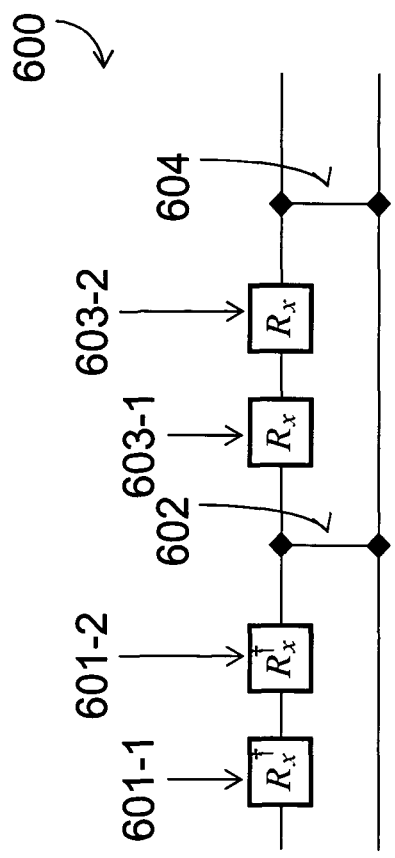
FIGS. 6A and 6B illustrate composite gates in accordance with various embodiments of the present invention.

FIG. 6A illustrates a quantum circuit 600 that implements a composite unitary gate. Unitary gates, including all single qubit unitary gates, can be generated from $$R_{j\beta} \equiv \exp\left(i\frac{\pi}{4}\sigma^\beta_j\right)$$

and the use of selective recoupling and rotations. An example of a composite gate 600 is an $X_iX_j$ gate, expressed as:

$$e^{-\phi X_iX_j} = U_{12}(\phi/2,\phi^-)C_{Xi}^{\pi/2}\circ U_{12}(\phi/2,\phi^-).$$

Quantum circuit 600 is comprised of a $-\pi/2$ rotation with $R_{iX}$ operations, an exchange coupling $U_{ij}(\phi/2,\phi^Z)$ shown as 602, a $\pi/2$ rotation with $R_{iX}$ operations and another exchange coupling $U_{ij}(\phi/2,\phi^Z)$ shown as 604. The $\pm\pi/2$ rotations can be implemented using two $\pm\pi/4$ rotations shown as 603-1 and 603-2. Next follows an exchange Hamiltonian coupling $U_{ij}(\phi/2,\phi^Z)$. The $-\pi/2$ rotation on the ith qubit is comprised of two $R^\dagger_{iX}$ operations shown as 601-1 and 601-2.

Figure 6B:
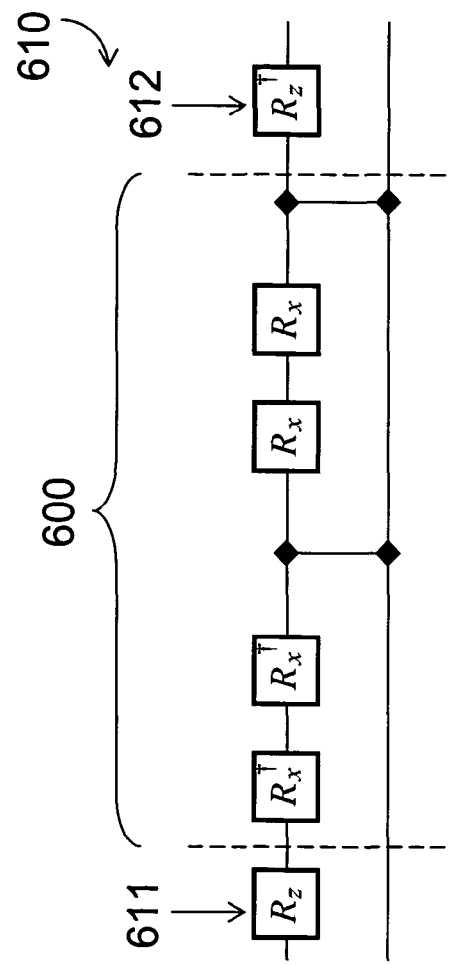

FIG. 6B illustrates a quantum circuit 610 describing a larger composite gate. Embodiments of the present invention include a composite $Y_iX_j$ gate 610 expressed as, $e^{-i\phi Y_iX_j}=C_Z^{-i\pi/4}\circ e^{-i\phi X_iX_j}$. The gate 610 is comprised of a $\pi/4$ rotation with a $R_{iz}$ operation 611, the composite gate 600, a $-\pi/4$ rotation a $R_{iz}$ operation 612.

Alternative Embodiments

All references cited herein are incorporated herein by reference in their entirety and for all purposes to the same extent as if each individual publication or patent or patent application was specifically and individually indicated to be incorporated by reference in its entirety for all purposes. While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed:

1. A method for performing a single-qubit gate on the state of a data qubit, the method comprising:
    setting an ancillary qubit to a predetermined initial state |I>;
    coupling said data qubit and said ancillary qubit for a first period of time to apply said single-qubit gate to said data qubit; and
    measuring a state of said ancillary qubit, thereby collapsing the quantum state of the ancillary qubit to a classical result |0> or |1>, and wherein the classical result, |0> or |1>, indicates whether said single-qubit gate has been applied to said data qiubit.

2. The method of claim 1, wherein, when said measuring indicates that said single-qubit gate was not successfully applied to said data qubit, the method further comprises coupling said data qubit and said ancillary qubit for a second period of time.

3. The method of claim 1, wherein said predetermined initial state |I> comprises a superposition of basis states of said ancillary qubit.

4. The method of claim 3, wherein said predetermined initial state has the form $$|I\rangle = \frac{a|0\rangle + b|1\rangle}{\sqrt{2}},$$

wherein,
    |0> is a first basis state for said ancillary qubit;
    |1> is a second basis state for said ancillary qubit;
    a is a first probability amplitude;
    b is a second probability amplitude; and
    the magnitude of a and b are about the same.

5. The method of claim 4, wherein said predetermined initial state is obtained by applying a single-qubit Pauli X gate for a phase $\pi/2$ to said ancillary qubit for a predetermined period of time.

6. The method of claim 5, wherein said predetermined period of time is about $$\frac{h}{\Delta}\frac{\pi}{2},$$

wherein h is Planck's constant and $\Delta$ is the tunneling amplitude of said ancillary qubit.

7. The method of claim 1, wherein said data qubit is a superconducting qubit.

8. The method of claim 7, wherein said superconducting qubit is a superconducting phase qubit.

9. The method of claim 8, wherein said superconducting phase qubit is comprised of an unconventional superconducting material.

10. The method of claim 8, wherein said superconducting phase qubit is a permanent readout superconducting qubit or a two-junction flux qubit.

11. The method of claim 7, wherein the superconducting qubit is a superconducting charge qubit.

12. The method of claim 1, wherein said coupling of said data qubit and said ancillary qubit for a first period of time comprises applying a Josephson gate between said data qubit and said ancillary qubit.

13. The method of claim 1, wherein said single-qubit gate is a single-qubit Pauli Z gate.

14. The method of claim 1, wherein said first period of time is about $$\frac{h}{J_1} \cdot \frac{\pi}{2},$$

wherein, $J_1$ is a coupling term between said ancillary qubit and said data qubit during said coupling; and h is Planck's constant.

15. The method of claim 3, wherein said second period of time is about $$\frac{h}{J_2} \cdot \pi$$

wherein, $J_2$ is a coupling term between said ancillary qubit and said data qubit during said second coupling; and h is Planck's constant.

16. The method of claim 2, wherein said second time period is about equal to said first time period and wherein a coupling term between said ancillary qubit and said data qubit during said first coupling is about double a coupling term between said ancillary qubit and said data qubit during said second coupling.

17. The method of claim 1, wherein said coupling of said data qubit and said ancillary qubit for said first period of time comprises an XX gate.

18. The method of claim 1, wherein said single-qubit gate is an X gate or a bit-flip gate.

19. The method of claim 1, wherein said coupling of said data qubit and said ancillary qubit is a YY gate.

20. The method of claim 1, wherein said single-qubit gate is a Y gate.

21. A method for applying a single-qubit gate to an arbitrary quantum state, wherein said arbitrary quantum state is initially on a data qubit, the method comprising:

setting a state of a first and second ancillary qubit to an entangled initial state |I⟩;

weakly measuring a state of said data qubit and said first ancillary qubit thereby performing said single qubit gate on said arbitrary quantum state with a probability; and determining a first result from said weakly measuring step.

22. The method of claim 21, wherein said arbitrary quantum state is present on said second ancillary qubit after said weakly measuring step and said first result indicates that said single-qubit gate has been applied to said arbitrary quantum state.

23. The method of claim 21, wherein said arbitrary quantum state is present on said second ancillary qubit after said weakly measuring step and said first result indicates that said single-qubit gate was not applied on said second ancillary qubit, the method further comprising:

applying a first correction, wherein said first correction comprises weakly measuring the state of said data qubit and said first ancillary qubit; and determining a second result.

24. The method of claim 23, wherein said second result indicates that said first correction applied the Hermitian conjugate of said single-qubit gate on said arbitrary quantum state that is present on said second ancillary qubit after said first correction.

25. The method of claim 24, the method further comprising correcting the state of said second ancillary qubit for said Hermitian conjugate of said single-qubit gate.

26. The method of claim 25, wherein correcting the state of said second ancillary qubit for said Hermitian conjugate of said single-qubit gate comprises coupling said first ancillary qubit and said second ancillary qubit with an exchange two-qubit unitary operator:

$$U^{EX}_{3,2}(\pi/2,0).$$

27. The method of claim 23, wherein, when said second result indicates that the Hermitian conjugate of said single-qubit gate was not applied on said arbitrary quantum state, now present on said second ancillary qubit, the method further comprises:

applying a second correction, wherein said second correction comprises weakly measuring the state of said first ancillary qubit and said second ancillary qubit; and determining a third result.

28. The method of claim 27, wherein said arbitrary quantum state is present on said data qubit after applying said second correction and said third result indicates that said single-qubit gate was applied on said arbitrary quantum state.

29. The method of claim 27, wherein said arbitrary quantum state is present on said data qubit after applying said second correction and said third result indicates that the Hermitian conjugate of said single-qubit gate was applied on said arbitrary quantum state.

30. The method of claim 29, the method further comprising correcting the state of said data qubit for said Hermitian conjugate of said single-qubit gate.

31. The method of claim 30, wherein the correction for said Hermitian conjugate of said single-qubit gate comprises coupling said data qubit and said first ancillary qubit via an exchange two-qubit unitary operator:

$$U^{EX}_{3,2}(\pi/2,0).$$

32. The method of claim 21, wherein said entangled initial state comprises a superposition of basis states of said first ancillary qubit and said second ancillary qubit.

33. The method of claim 32, wherein said initial state |I⟩ has the form:

$$|I\rangle \approx \frac{1}{\sqrt{2}}(a|01\rangle - ib|10\rangle),$$

wherein,
|0> is a first state for said first ancillary qubit and said second ancillary qubit;
|0> is a second state for said first ancillary qubit and said second ancillary qubit;
a is a first probability amplitude;
b is a second probability amplitude;
the magnitude of a and b are about the same; and
$i=\sqrt{-1}$.

34. The method of claim 33, wherein said setting said state of said first ancillary qubit and said state of said second ancillary qubit to said entangled initial state |I> comprises:
a first coupling of said first and second ancillary qubits for a duration $t_1$;
measuring the state of at least one of said first and second ancillary qubits; and
a second coupling of said first and second ancillary qubits for a second duration $t_\beta$.

35. The method of claim 34, wherein said first coupling allows the entangled state of said first and second ancillary qubits to relax to their respective ground states.

36. The method of claim 35, wherein said duration, is one microsecond or less.

37. The method of claim 34, wherein said measuring results in an overall state of either |10> or |01>.

38. The method of claim 34, wherein said second coupling creates a phase difference that is about π radians between the respective basis states of the entangled pair wherein the overall entangled state satisfies |I>.

39. The method of claim 34, wherein said second duration $t_\beta$ is about $$\frac{h}{J^\alpha} \cdot \frac{\pi}{8}$$

wherein $J^\alpha$ is a coupling term of an exchange Hamiltonian $H^{ex}$ between the first ancillary qubit and the second ancillary qubit and h is Planck's constant.

40. The method of claim 34, wherein said second duration $t_\beta$ is one microsecond or less.

41. The method of claim 21, wherein said data qubit is a superconducting qubit.

42. The method of claim 41, wherein said superconducting qubit is a superconducting phase qubit.

43. The method of claim 42, wherein said superconducting phase qubit is comprised of an unconventional superconducting material.

44. The method of claim 42, wherein said superconducting phase qubit is a permanent readout superconducting qubit or a two junction flux qubit.

45. The method of claim 41, wherein said superconducting qubit is a superconducting charge qubit.

46. The method of claim 21, wherein said data qubit is a quantum dot, a donor atom in silicon, a photon, a resonant cavity, an atom, or an electron.

47. The method of claim 21, wherein said first and second ancillary qubits are of the same type of qubit as said data qubit.

48. The method of claim 21, wherein said first and second ancillary qubits are not the same type of qubit as said data quibit.

49. The method of claim 21, wherein said single-qubit gate is a Z gate, a phase gate, an X gate, a bit-flip gate, or a Y gate.

50. The method of claim 21, further comprising creating a universal set of gates using a plurality of applications of said single qubit gate in order to create a plurality of composite gates that form said universal set of gates.

51. A method for applying a single-qubit gate to an arbitrary quantum state that is initially present on a data qubit, the method comprising:
setting a state of a first and second ancillary qubit to an entangled initial state |I>;
performing a weak measurement on a state of said data qubit and said first ancillary qubit;
determining whether said weak measurement indicates said data qubit and said first ancillary qubit were in a singlet or triplet state; wherein
when the data qubit and said first ancillary qubit are in the singlet state, said single-qubit gate was applied on said arbitrary quantum state, and
when the data qubit and said first ancillary qubit are in the triplet state, the Hermitian conjugate of said single-qubit gate was applied on said arbitrary quantum state; and
performing a corrective operation when the data qubit and said first ancillary qubit are in the triplet state to convert the Hermitian conjugate of said single-qubit gate to said single-qubit gate.

* * * * *

UNITED STATES PATENT AND TRADEMARK OFFICE
CERTIFICATE OF CORRECTION

PATENT NO.       : 7,018,852 B2                                    Page 1 of 1
APPLICATION NO.  : 10/628128
DATED            : March 28, 2006
INVENTOR(S)      : Wu et al.

It is certified that error appears in the above-identified patent and that said Letters Patent is hereby corrected as shown below:

Column 24, line 27, replace "qiubit." with --qubit.--

Column 27, line 22, replace "duration , is" with --duration $t_i$ is--

Signed and Sealed this

Twenty-second Day of August, 2006

JON W. DUDAS
*Director of the United States Patent and Trademark Office*